(12) United States Patent
Choi et al.

(10) Patent No.: US 12,040,560 B2
(45) Date of Patent: Jul. 16, 2024

(54) ANTENNA STRUCTURE AND ELECTRONIC DEVICE COMPRISING SAME

(71) Applicants: Samsung Electronics Co., Ltd., Gyeonggi-do (KR); Industry-Academic Cooperation Foundation, Yonsei University, Seoul (KR)

(72) Inventors: Taihwan Choi, Gyeonggi-do (KR); Youngjoong Yoon, Seoul (KR); Janghwan Bae, Seoul (KR); Seunghun Cha, Seoul (KR); Sungsoo Kim, Gyeonggi-do (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 249 days.

(21) Appl. No.: 17/569,084

(22) Filed: Jan. 5, 2022

(65) Prior Publication Data

US 2022/0131269 A1    Apr. 28, 2022

Related U.S. Application Data

(63) Continuation of application No. PCT/KR2020/008797, filed on Jul. 6, 2020.

(30) Foreign Application Priority Data

Jul. 5, 2019   (KR) .................. 10-2019-0081652

(51) Int. Cl.
*H01Q 1/24*   (2006.01)
*H01Q 5/35*   (2015.01)
(Continued)

(52) U.S. Cl.
CPC ............. *H01Q 5/35* (2015.01); *H01Q 21/064* (2013.01); *H04M 1/0214* (2013.01); *H04M 1/0266* (2013.01); *H01Q 1/243* (2013.01)

(58) Field of Classification Search
CPC ............ H01Q 1/243; H01Q 1/24; H01Q 1/44; H01Q 13/10; H01Q 21/06; H01Q 21/064;
(Continued)

(56) References Cited

U.S. PATENT DOCUMENTS 9,191,471 B2 * 11/2015 Hsu .................... H04M 1/0202
9,735,461 B2 *  8/2017 Lo Hine Tong ....... H01Q 1/243
(Continued)

FOREIGN PATENT DOCUMENTS

CN        103943959        7/2014
CN        108270080        7/2018
(Continued)

OTHER PUBLICATIONS

PCT/ISA/210 Search Report issued on PCT/KR2020/008797, dated Oct. 30, 2020, pp. 8.
(Continued)

*Primary Examiner* — Tho G Phan
(74) *Attorney, Agent, or Firm* — The Farrell Law Firm, P.C.

(57) ABSTRACT

Disclosed is an electronic device including a housing having a first plate, a second plate facing in a direction opposite to the first plate, and a side surface member surrounding a space between the first plate and the second plate and including a conductive portion, a communication module, and an antenna structure electrically connected with the communication module, wherein the antenna structure includes at least one first antenna element formed in the conductive portion and including a first slot having a first portion extending in a first length in a first direction and a second portion extending in a second length in a second direction different from the first direction, and at least one second antenna element formed in a position spaced apart by a predetermined distance from the first antenna element in
(Continued)

the conductive portion and including at least one second slot having a fourth portion extending in the first length in the first direction and a fifth portion extending in the second length in a third direction different from the second direction.

19 Claims, 24 Drawing Sheets

(51) Int. Cl.
  *H01Q 13/10* (2006.01)
  *H01Q 21/06* (2006.01)
  *H04M 1/02* (2006.01)
(58) Field of Classification Search
  CPC ........ H01Q 21/08; H01Q 21/24; H01Q 25/00; H01Q 3/30; H01Q 5/35; H04M 1/02; H04M 1/0214; H04M 1/026; H04M 1/0266
  See application file for complete search history.

(56) References Cited

U.S. PATENT DOCUMENTS

| | | | | |
|---|---|---|---|---|
| 10,644,382 | B2* | 5/2020 | Lee | H04M 1/0283 |
| 10,854,953 | B2* | 12/2020 | Romano | H04M 1/026 |
| 10,862,216 | B1* | 12/2020 | Ayala Vazquez | H01Q 21/28 |
| 11,145,953 | B2* | 10/2021 | Kim | H01Q 1/48 |
| 11,152,708 | B2* | 10/2021 | Barrera | H01Q 13/10 |
| 11,349,219 | B2* | 5/2022 | Toyao | H01Q 5/307 |
| 2003/0090426 | A1 | 5/2003 | Sun et al. | |
| 2007/0205947 | A1 | 9/2007 | Boyle | |
| 2008/0246678 | A1 | 10/2008 | Rao et al. | |
| 2014/0203974 | A1 | 7/2014 | Liu et al. | |
| 2016/0192517 | A1 | 6/2016 | Tsao | |
| 2017/0093022 | A1 | 3/2017 | Cai et al. | |
| 2017/0222326 | A1 | 8/2017 | Wight et al. | |
| 2019/0140342 | A1 | 5/2019 | Lim et al. | |
| 2019/0288392 | A1 | 9/2019 | Kim et al. | |
| 2021/0111484 | A1 | 4/2021 | Jang et al. | |

FOREIGN PATENT DOCUMENTS

| | | |
|---|---|---|
| CN | 108987906 | 12/2018 |
| KR | 10-2016-0148698 | 12/2016 |
| KR | 10-2017-0120985 | 11/2017 |
| KR | 10-2018-0050820 | 5/2018 |
| KR | 10-2018-0060299 | 6/2018 |

OTHER PUBLICATIONS

PCT/ISA/237 Written Opinion issued on PCT/KR2020/008797, dated Oct. 30, 2020, pp. 6.

* cited by examiner

ANTENNA STRUCTURE AND ELECTRONIC DEVICE COMPRISING SAME

PRIORITY

This application is a Bypass Continuation Application of International Application No. PCT/KR2020/008797, which was filed on Jul. 6, 2020, and is based on and claims priority under 35 U.S.C. § 119 to Korean Patent Application No. 10-2019-0081652, which was filed in the Korean Intellectual Property Office on Jul. 5, 2019, the entire disclosure of each of which is incorporated herein by reference.

BACKGROUND

1. Field

The disclosure relates generally to a wireless device, and more particularly, to an antenna structure providing a wireless communication function and an electronic device including the same.

2. Description of Related Art

The provision of services of stable quality over a commercially available wireless communication network require a high antenna device gain and a broad beam coverage area. A next-generation (e.g., fifth generation (5G)) mobile communication service with a frequency band of a few tens of gigahertz (GHz) ranging from 30 GHz to 300 GHz and a resonant frequency wavelength ranging about 1 millimeter (mm) to about 10 mm) implements simple wireless linkage with nearby electronic devices and enhanced energy efficiency, thereby providing enhanced connection expandability and quicker and more stable quality of wireless communication network to users.

Since the resonant frequency wavelength of the antenna device used for 5G communication (or mmWave communication) merely ranges from about 1 mm to about 10 mm, the radiation performance of the antenna device may be significantly distorted depending on the installation environment due to its high straightness and directivity. For example, when an antenna device for mmWave communication is equipped in an electronic device, the performance of the antenna device may decrease due to interference by the structures around the electronic device or the user's body.

Control of the antenna beam radiation range of the antenna device (steering range control) is possible using the processor and the communication module mounted inside the electronic device, but such control is limited in this construction. It is also difficult to exhibit the optimized operating characteristics of the antenna device because the bezel design of the metal material of the electronic device is not considered.

Since the slot-type antenna device discloses a single slot antenna structure that does not easily support a wider frequency band, the slot=type antenna device may have difficulty in supporting a plurality of frequency bands.

Therefore, there is a need in the art for an antenna structure and an electronic device including the antenna structure that may secure more stable radiation performance than in the aforementioned prior art electronic devices.

SUMMARY

The disclosure has been made to address at least the above-mentioned problems and/or disadvantages and to provide at least the advantages described below.

Accordingly, an aspect of the disclosure is to provide an electronic device and an antenna structure capable of providing a stable wireless communication function by reducing distortion of radiation performance due to interference of the installation environment, such as when at least a portion of the housing is formed of a metal material, and surroundings of the antenna structure.

Another aspect of the disclosure is to provide an antenna structure capable of securing a stable radiation performance in a mmWave frequency band and an electronic device including the same.

Another aspect of the disclosure is to provide an antenna structure capable of operating an appropriate antenna according to various signal environments and implementing multiple bands and multiple polarizations and an electronic device including the same.

Another aspect of the disclosure is to provide an antenna structure and an electronic device including the same that may secure stable radiation performance by using at least a portion of a housing as an antenna element for millimeter wave communication. That is, the radiation range of the antenna beam is controlled by an antenna element being formed using a conductive portion included in a side surface member and a feeding unit and a communication circuit being connected to the antenna element.

Another aspect of the disclosure is to provide an antenna structure capable of supporting several frequency bands using one slot.

Another aspect of the disclosure is to enable selective generation of either a single or dual polarization by providing an antenna element formed using at least one pair of slots having shapes symmetrical to each other, and a feeding unit and a communication circuit connected to the antenna element.

In accordance with an aspect of the disclosure, an electronic device includes a housing including a first plate, a second plate facing in a direction opposite to the first plate, and a side surface member surrounding a space between the first plate and the second plate and including a conductive portion, a communication module, and an antenna structure electrically connected with the communication module, wherein the antenna structure includes at least one first antenna element formed in the conductive portion and including a first slot having a first portion extending in a first length in a first direction and a second portion extending in a second length in a second direction different from the first direction, and at least one second antenna element formed in a position spaced apart by a predetermined distance from the first antenna element in the conductive portion and including at least one second slot having a fourth portion extending in the first length in the first direction and a fifth portion extending in the second length in a third direction different from the second direction.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
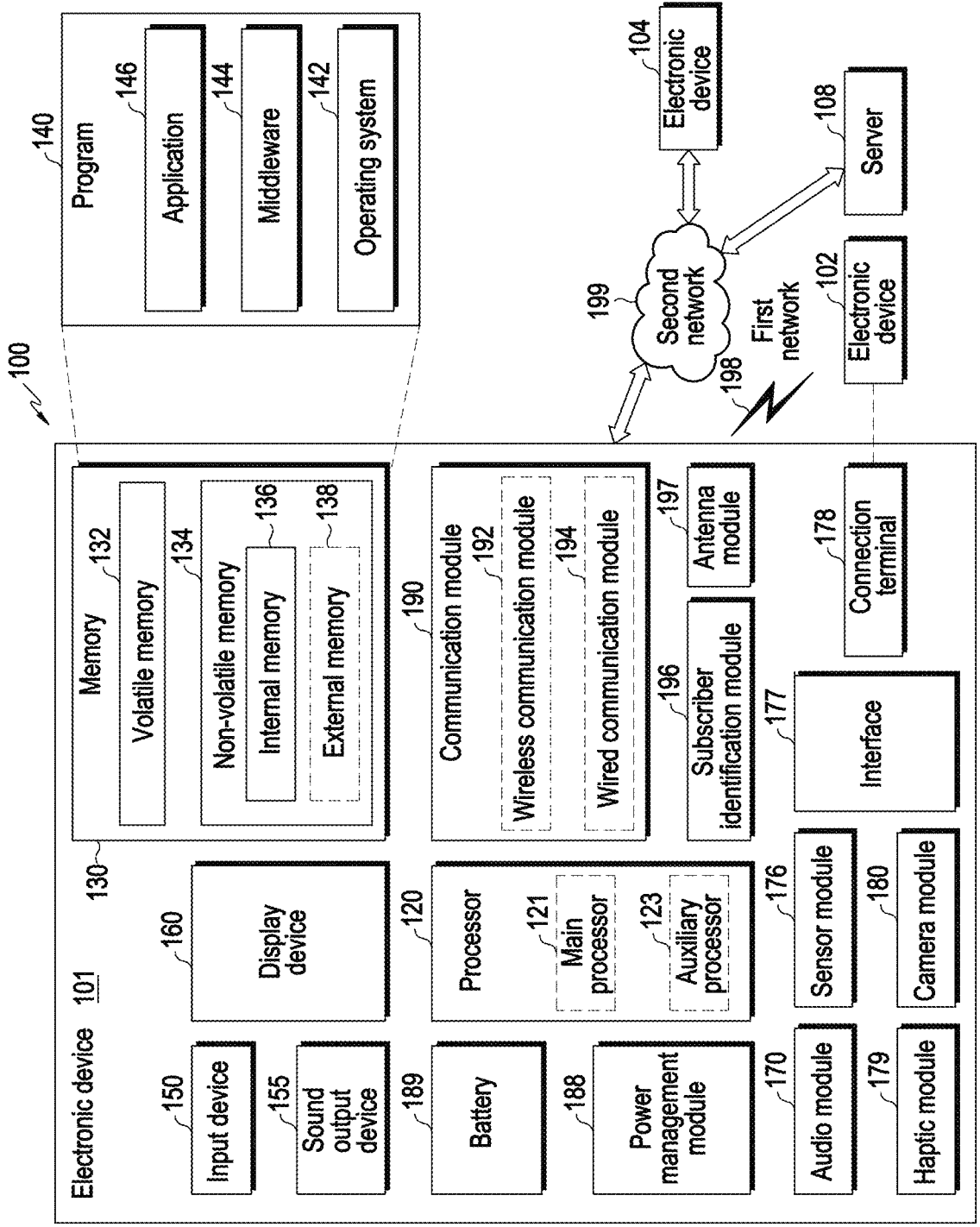
FIG. 1 illustrates an electronic device in a network environment according to an embodiment.

Hereinafter, embodiments of the disclosure are described with reference to the accompanying drawings. It should be noted that, in the drawings, the same or like elements are designated by the same or like reference signs as much as possible. In the following description and drawings, a detailed description of known functions or configurations that may make the subject matter of the disclosure unnecessarily unclear will be omitted.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation.

According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134.

According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa.

According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
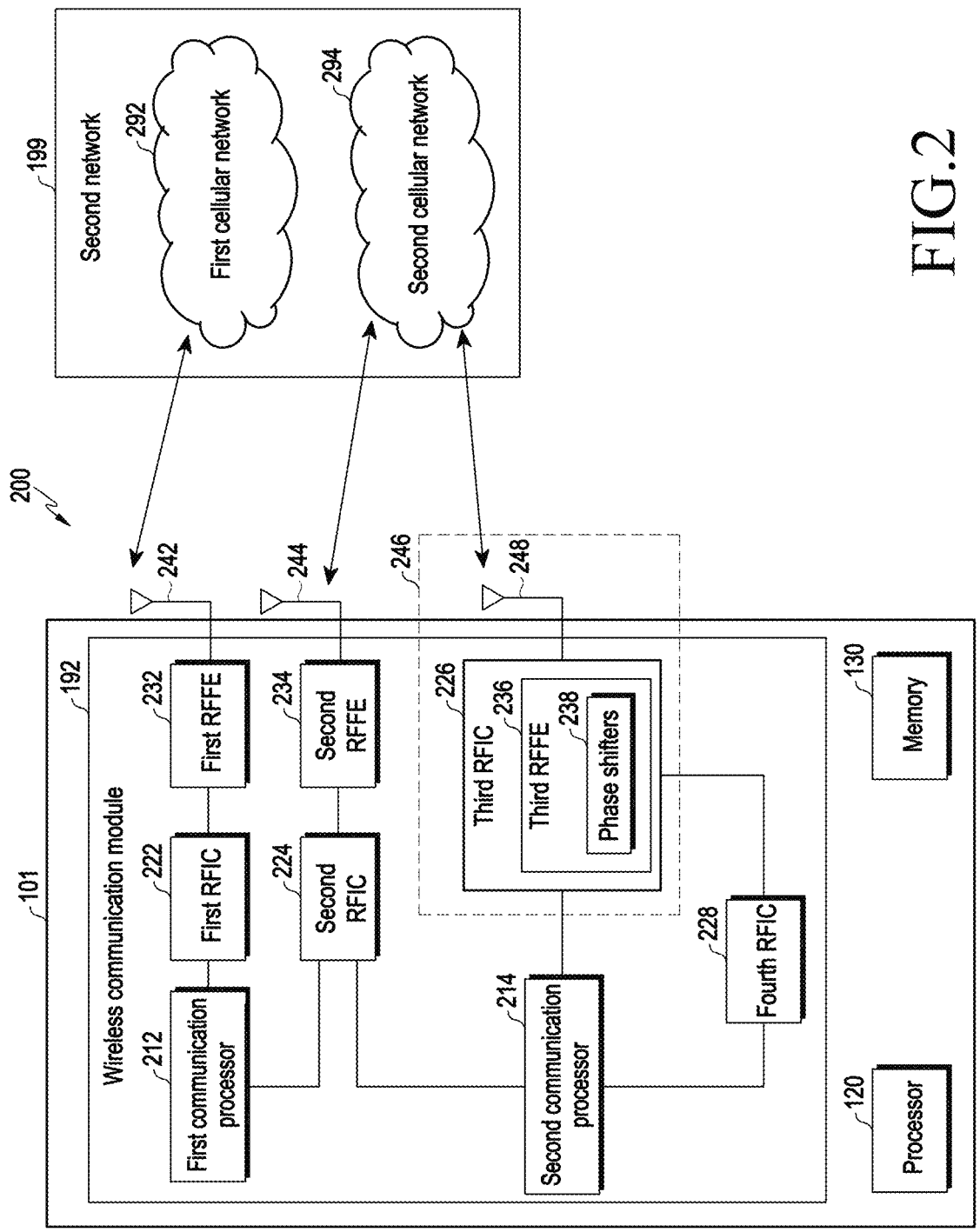
FIG. 2 illustrates an electronic device in a network environment including a plurality of cellular networks according to an embodiment.

FIG. 2 illustrates an electronic device 100 in a network environment including a plurality of cellular networks according to an embodiment.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or included as part of the third RFIC 226.

The first communication processor 212 may establish a communication channel of a band that is to be used for wireless communication with the first cellular network 292 or may support legacy network communication via the established communication channel. According to various embodiments, the first cellular network 292 may be a legacy network that includes second generation (2G), third generation (3G), fourth generation (4G), or long-term evolution (LTE) networks. The second communication processor 214 may establish a communication channel corresponding to a designated band (e.g., from about 3 GHz to about 100 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel. According to an embodiment, the first CP 212 and the second CP 214 may be implemented in a single chip or a single package. According to an embodiment, the first communication processor 212 or the second communication processor 214, along with the processor 120, an assistance processor 123, or communication module 190, may be formed in a single chip or single package.

Upon transmission, the first RFIC 222 may convert a baseband signal generated by the first CP 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, a 5G Sub6 RF signal) that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, an IF signal) and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

The second communication processor 214 may be directly connected to the third RFIC 226. Additionally or alternatively, when the electronic device 101 includes the fourth RFIC 228 separately from, or as at least part of, the third RFIC 226, the second communication processor 214 may be connected with the third RFIC 226 through the fourth RFIC 228.

The first RFIC 222 and the second RFIC 224 may be implemented as at least part of a single chip or single package. The first RFFE 232 and the second RFFE 234 may also be implemented as at least part of a single chip or single package. At least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may decrease the length of the transmission line therebetween. This may reduce a loss (e.g., attenuation) of a high-frequency band (e.g., from about 6 GHz to about 60 GHz) signal used for 5G network communication due to the transmission line. Thus, enhanced communication quality may be experienced between the electronic device 101 and the second cellular network 294 (e.g., a 5G network).

According to an embodiment, the antenna 248 may be formed as an array antenna which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside (e.g., 5G network base station).

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, after accessing a 5G network access network, the electronic device 101 may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figures 3A, 3B:
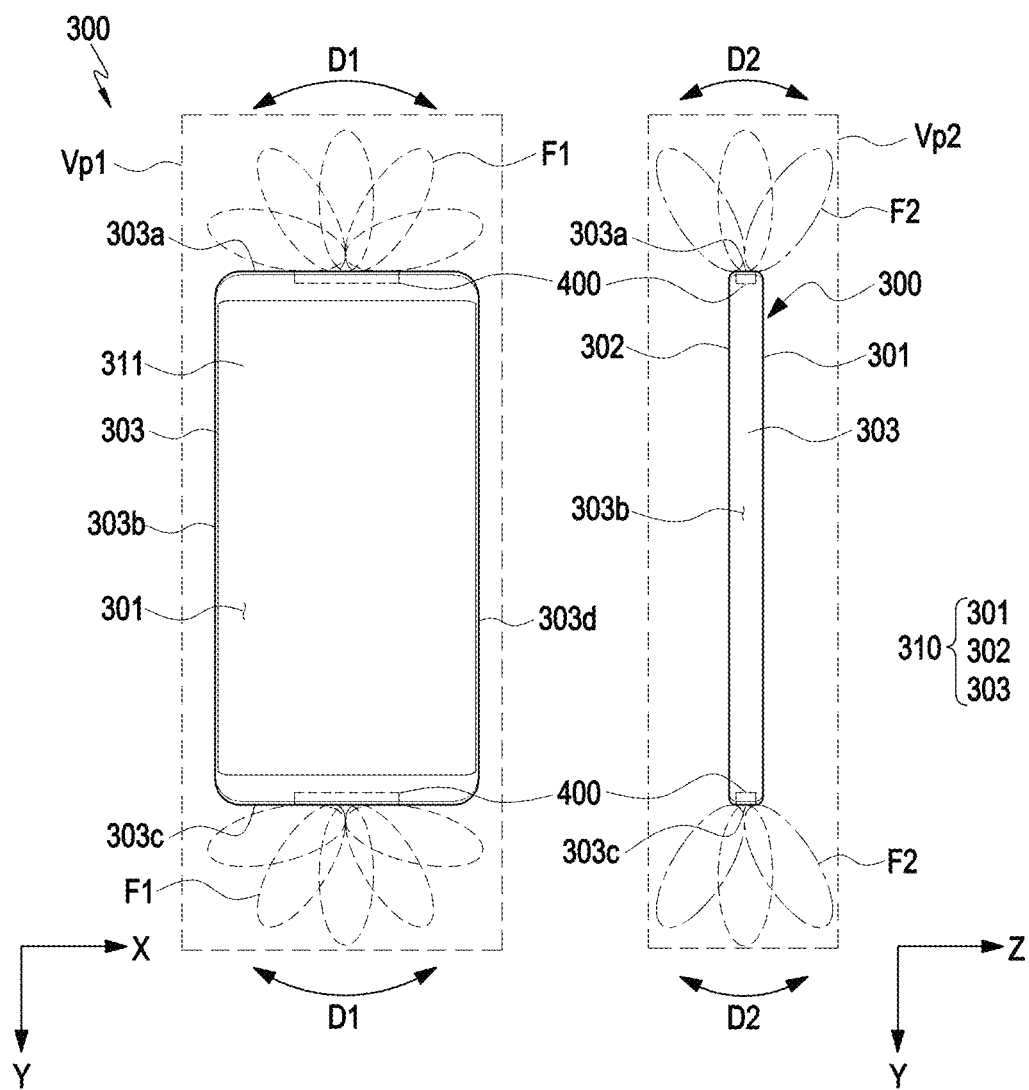
FIG. 3A is a front view illustrating a range in which an antenna beam is radiated from an electronic device, according to an embodiment.
FIG. 3B is a side view illustrating a range in which an antenna beam is radiated from an electronic device, according to an embodiment.
Figure 4:
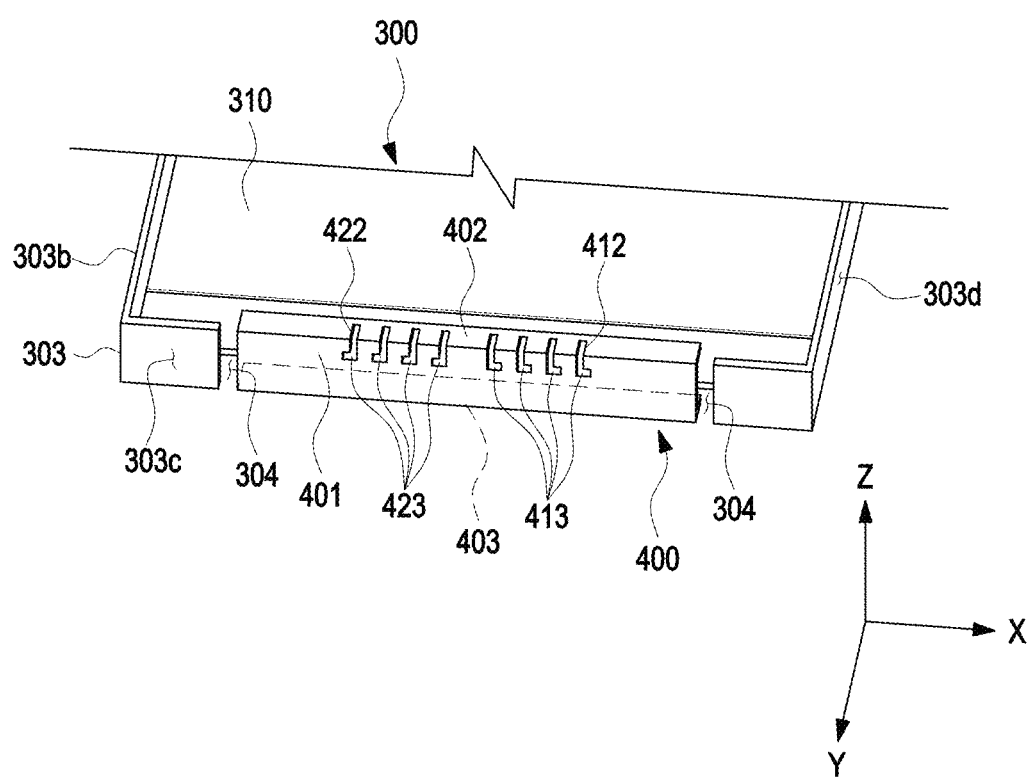
FIG. 4 illustrates a housing and an antenna structure of an electronic device according to an embodiment.

FIG. 3A is a front view illustrating a range (beam steering range) in which an antenna beam is radiated from the electronic device 300 (e.g., the electronic device 101 of FIG. 1) according to an embodiment. FIG. 3B is a side view illustrating a range (beam steering range) in which an antenna beam is radiated from the electronic device 300 (e.g., the electronic device 101 of FIG. 1) according to an embodiment. FIG. 4 illustrates a housing 310 and an antenna structure 400 of the electronic device 300, according to an embodiment.

FIG. 3A illustrates a state in which the front surface 301 of the electronic device 300 is visible, and FIG. 3B may illustrate a state in which a side surface 303b of the electronic device 300 is visible.

Referring to FIGS. 3A, 3B, and 4, the electronic device 300 may include a housing 310 and may include at least one processor (e.g., the processor 120 of FIG. 1) and communication module (e.g., the communication module 190 of FIG. 1) in the housing 310. Further, the electronic device (e.g., the electronic device 101 of FIG. 1) may include an antenna structure 400 electrically connected with the communication module.

According to an embodiment, the housing 310 may include the other components of the electronic device 300. The housing 310 may include, e.g., a front plate (or first plate) including a front surface 301 of the electronic device 300, a rear plate (or second plate) including a rear surface facing in a direction opposite to the front surface 301, and a side surface member 303 attached to, or integrally formed with the rear plate and surrounding a space between the front plate and the rear plate. For example, the side surface member 303 may include at least one side surface 303a, 303b, 303c, and 303d facing in different directions from the front surface 301 and the rear surface 302. As another example, the side surface member may include a conductive portion including a conductive material. According to an embodiment, a display 311 that is visible through a substantial portion of the front plate may be mounted on the front surface 301 of the electronic device 300.

According to an embodiment, the coordinate axes shown in the drawings of the disclosure may be used to denote the directions in which some components are oriented. Here, the coordinate axes may be the coordinate axes X, Y, and Z in a three-dimensional (3D) space. Referring to FIG. 3A, FIG. 3B and FIG. 4 together, the X axis may be parallel to the width direction of the electronic device 300 (or the width direction of the antenna structure 400), and the Y axis may be parallel to the length direction of the electronic device 300 (or the thickness direction of the antenna structure 400). The Z axis may be parallel to the thickness direction of the electronic device 300 (or the height direction of the antenna structure 400). According to an embodiment, the XY plane may be parallel to a virtual horizontal surface Vp1 drawn parallel to one surface of the front plate of the electronic device, and the YZ plane may be parallel to a virtual vertical surface Vp2 orthogonal to the virtual horizontal surface Vp1 of the electronic device.

According to various embodiments, the processor 120 disposed inside the housing 310 may include one or more of a central processing unit, an application processor, a graphic processing unit (GPU), an image signal processor of a camera, or a baseband processor (or a communication processor (CP)). According to an embodiment, the processor 120 may be implemented in a system-on-chip (SoC) or system-in-package (SiP). The communication module 190 may include, e.g., a baseband processor or at least one communication circuit (e.g., IFIC, or RFIC). The communication module 190 may include, e.g., a baseband processor separate from the processor 120 (e.g., an application processor (AP)). In this case, the baseband processor of the communication module 190 may be disposed in one chip, together with the processor 120, or may be disposed in the form of an independent chip.

According to various embodiments, it is possible to correspond to a first network 198 for short-range communication or a second network 199 for long-distance communication through the processor 120 and the communication module 190. According to an embodiment, it is possible to correspond to a first cellular network 292 and a second cellular network 294 included in the second network 199 through the processor 120 and the communication module 190. The first cellular network 292 and the second cellular network 294 may have a fourth generation (4G) network and a fifth generation (5G) network, respectively. The 4G network may support the long term evolution (LTE) protocol specified by the 3rd generation partnership project (3GPP). The 5G network may support, e.g., the new radio (NR) protocol specified by the 3GPP.

According to various embodiments, the electronic device 300 may include a plurality of antenna modules (e.g., the third antenna module 246 of FIG. 2). The plurality of antenna modules may be disposed adjacent to the housing 310 inside the electronic device 300. In an embodiment, the at least one antenna module may reduce a propagation loss path when at least a portion of the housing is used as an antenna element (e.g., the antenna element 248 of FIG. 2).

For example, according to an embodiment in which four antenna modules (e.g., the third antenna module 246 of FIG. 2) are provided, when viewed from above the front plate of the electronic device, one antenna module may be disposed adjacent to the first side surface 303a at the upper end of the electronic device 300. Another antenna module may be disposed adjacent to the second side surface 303b on the left side of the electronic device 300. Another antenna module may be disposed adjacent to the third side surface 303c at the lower end of the electronic device 300. The other antenna module may be disposed adjacent to the fourth side surface 303d on the right side of the electronic device 300. This is merely an example, and other various arrangements may be possible.

According to various embodiments, the at least one antenna module (e.g., the third antenna module 246) may include at least one communication circuit (e.g., the third RFIC (226 of FIG. 2)). When at least a portion of the housing is used as an antenna element (e.g., the antenna element 248), according to an embodiment, the communication circuit (e.g., the third RFIC 226) may not be disposed on the same substrate as the antenna element.

FIG. 3A and FIG. 3B illustrate that the antenna structure 400 is disposed at the center of the upper end and the center of the lower end of the electronic device 300 to radiate the antenna beam. However, the antenna structure 400 may be disposed in various positions different than those shown in the drawings.

According to various embodiments, in the antenna structure 400, a first steering range of an antenna beam F1 (dashed line) may be formed on a virtual horizontal surface Vp1 of the electronic device 300. In an embodiment, the first steering range of the antenna beam F1 may cover substantially the entire range of the virtual horizontal surface Vp1 of the electronic device 300 along the D1 direction. According to various embodiments of the disclosure, the antenna structure 400 may have a second steering range of the antenna beam (F2) (dash-dotted line) on the virtual vertical surface Vp2 of the electronic device 300, as well as on the above-described one-dimensional area (virtual horizontal area). In an embodiment, the second steering range of the antenna beam F2 may cover substantially the entire range of the virtual vertical surface Vp2 of the electronic device 300 along the D2 direction.

According to an embodiment, the communication module (e.g., the communication module 190 of FIG. 1) may be electrically connected with the at least one antenna module (e.g., the third antenna module 246) using at least one conductive line, such as a coaxial cable or a flexible printed circuit board (FPCB).

According to various embodiments, at least a portion of the housing 310 may include a conductive material (e.g., metal (e.g., aluminum, stainless steel (STS), magnesium, or an alloy combining at least two thereof)). For example, at least a portion of the side surface member 303 of the housing 310 may include a metal frame (or metal bezel) structure, and at least another portion thereof may include a dielectric structure (e.g., a polymer structure).

According to various embodiments, in a case where at least a portion of the housing 310 includes a metal frame structure, if a radio signal (or a communication signal) (e.g., an RF signal) is radiated from a separate antenna element disposed inside the electronic device, the radio signal propagates along the surface of the metal frame of the housing 310 and may thus be influenced by antenna performance. According to another embodiment, the signal may be interfered with by other electronic components disposed inside the electronic device.

According to various embodiments of the disclosure, the electronic device 300 may include an antenna structure 400. The antenna structure 400 may be formed using a portion (the side surface member 303 including a conductive portion) of the housing 310 for 5G communication and may have a slot in the surface to support a plurality of frequency bands. An antenna structure 400 for stably transmitting/receiving millimeter waves while maximally reducing the path loss of propagation even when at least a portion of the housing 310 includes a conductive material, may be described below with reference to FIGS. 4 to 7.

Referring to FIG. 3A, FIG. 3B and FIG. 4, according to various embodiments of the disclosure, the electronic device 300 may include an antenna structure 400 including a slot-type antenna formed in at least a portion (e.g., the side surface member 303) of the housing 310. Here, the antenna structure 400 may further include a feeding unit (e.g., the feeding unit 360 of FIG. 5B) and may be electrically connected with the communication circuit (e.g., the third RFIC 226 of FIG. 2) included in the electronic device 300 to form an antenna module (e.g., the third antenna module 246 of FIG. 2).

According to an embodiment, the antenna structure 400 may be formed using a conductive portion 401 included in the side surface member 303 surrounding a space between a front plate and a rear plate of the housing 310. For example, the electronic device 300 may utilize at least a portion (e.g., the side surface member) of the housing 310 as an antenna element (e.g., the antenna structure 400 of FIG. 4). For example, the side surface member 303 including a conductive material, such as metal, may be formed as the antenna structure 400. Accordingly, other conductive materials may be prevented from being disposed between the antenna structure 400 and the outside, so that the antenna structure 400 may exchange signals with the outside with the interference minimized by other conductive materials. As an example, if the frequency is upconverted in the communication circuit (e.g., an RFIC), the electronic device 300 may radiate the RF signals transferred from the conductive lines through a portion of the housing 310 included in the antenna structure 400. As another example, the RF signal received through a portion of the housing 310 included in the antenna structure 400 is transmitted to the communication circuit so that the communication circuit may down-convert the RF signal into an IF signal.

Referring to FIGS. 3A and 4, the antenna structure 400 may include a portion of the housing 310 of the electronic device (e.g., the electronic device 300 of FIG. 3*a*) or may be formed separately from the housing 310. For example, when the antenna structure 400 includes a portion of the housing 310, the antenna structure 400 may form an external shape of the electronic device. According to an embodiment, the antenna structure 400 may be formed using a side surface member 303 surrounding a space between a front plate and a rear plate of the housing 310. As another example, when the antenna structure 400 is formed separately from the housing 310, the antenna structure 400 may be assembled together with the housing 310 to form the electronic device 300. As another example, the antenna structure 400 may be formed in an antenna module and/or on a printed circuit board mounted in the inner space of the electronic device 300.

According to an embodiment, at least one segment 304 may be formed in the electronic device 300. According to another embodiment, the segment 304 may be filled with a dielectric material (e.g., a polymer material). According to an embodiment, the segment 304 may be filled with a polymer material formed through an injection process. By filling the segment 304 with a polymer material, the segment 304 may electrically disconnect the portion used as the antenna element of the antenna structure 400 from other portions of the housing 310 while preventing infiltration of foreign substances from the outside.

According to an embodiment, the side surface member of the housing 310 may have a substantially flat surface. However, without being limited thereto, at least a portion of the side surface member may have a curved shape. As described above, the antenna structure 400 may be formed on the side surface member having various shapes. For example, the side surface member of the housing 310 may include, as its part or whole, a conductive portion 401 having a flat surface and formed of a conductive material. The conductive portion 401 may include a first surface (e.g., the first surface 401*a* of FIG. 5 described below) facing the outside of the electronic device (e.g., the electronic device 300 of FIG. 3A). For example, the side surface member 303 of the housing 310 may include a first extension portion 402 and/or a second extension portion (not shown in FIG. 4) extending from the conductive portion 401. As such, the conductive portion 401 is formed as well as a slot in the first extension portion 402 and/or the second extension portion, as described below with reference to FIG. 5. According to various embodiments, the antenna structure 400 may have substantially the same configuration as a portion of the side surface member 303. Accordingly, in the following description, the conductive portion 401, the first extension portion 402, and/or the second extension portion may be regarded as corresponding to one component of the antenna structure 400.

According to various embodiments, the antenna element may be an antenna element included in the third antenna module (e.g., the third antenna module 246 of FIG. 2) in the above-described embodiment. In the disclosure, the antenna element may also be formed as a slot (or slit) antenna having a long and thin slit (groove). An effect similar to that of a patch antenna, a loop antenna, or a dipole antenna may be achieved through the slot antenna.

Referring to FIG. 4, in addition to at least one slot, antenna elements 412 and 422 may be formed in the side surface member 303. Further, according to an embodiment, a plurality of antenna elements 412 and 422 may be provided to form array antennas 413 and 423. According to an embodiment, the antenna structure 400 may include at least one pair of antenna elements 412 and 422. According to another embodiment, the antenna structure 400 may include the array antennas 413 and 423. For example, the first antenna element 412 may include at least one first slot (e.g., the first slot 411 of FIG. 6), and the second antenna element 422 may include a second slot (e.g., the second slot 421 of FIG. 6) having a different shape from the first slot 411. According to various embodiments, there may be formed a first array antenna 413 including a plurality of first antenna elements 412 and a second array antenna 423 including a plurality of second antenna elements 422.

Figure 5A:
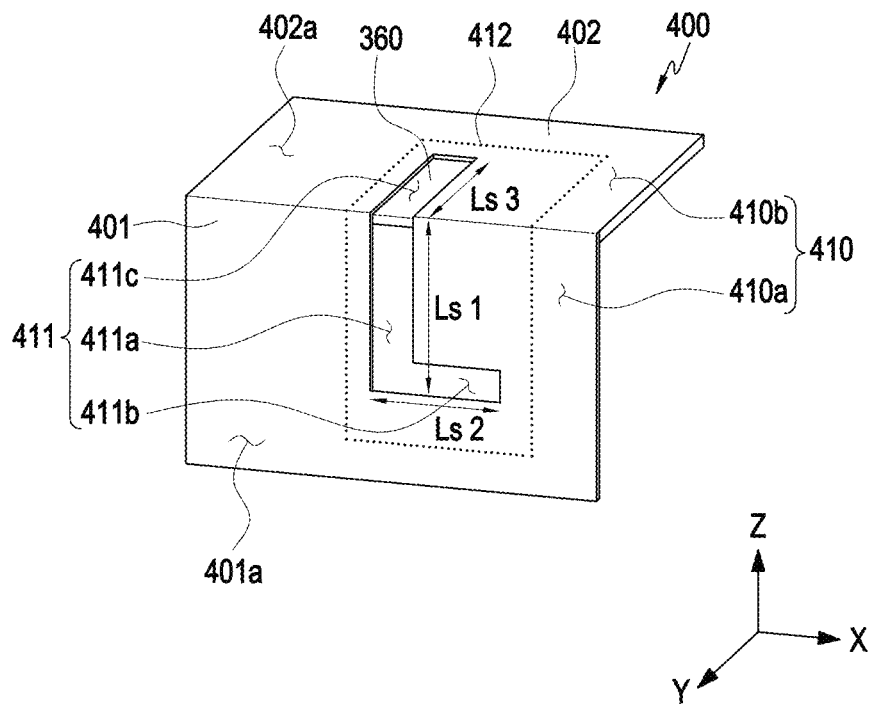
FIG. 5A illustrates an antenna structure viewed from a first direction, according to an embodiment.
Figure 5B:
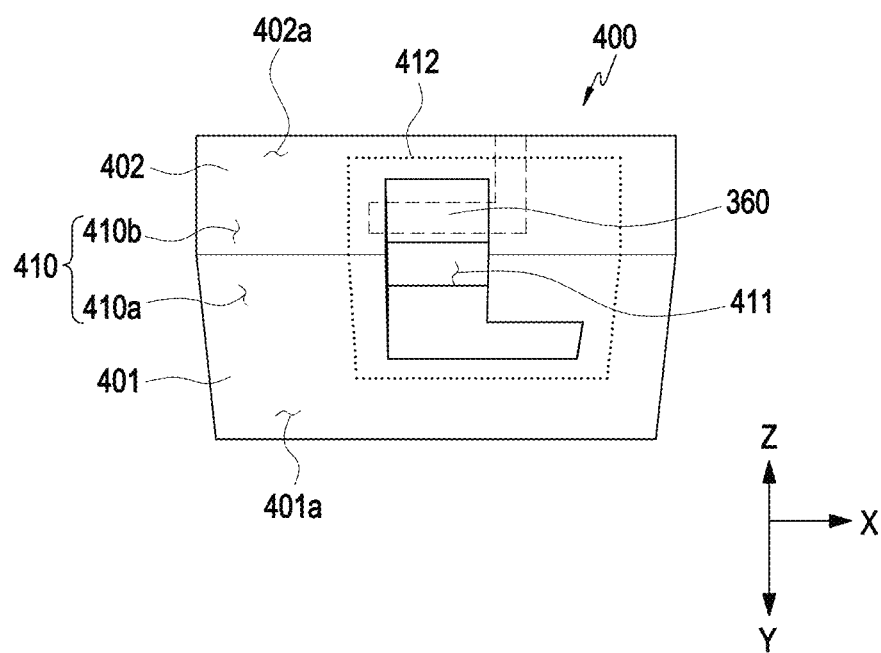
FIG. 5B illustrates an antenna structure viewed from a second different direction from the first direction of FIG. 5A, according to an embodiment.
Figure 5C:
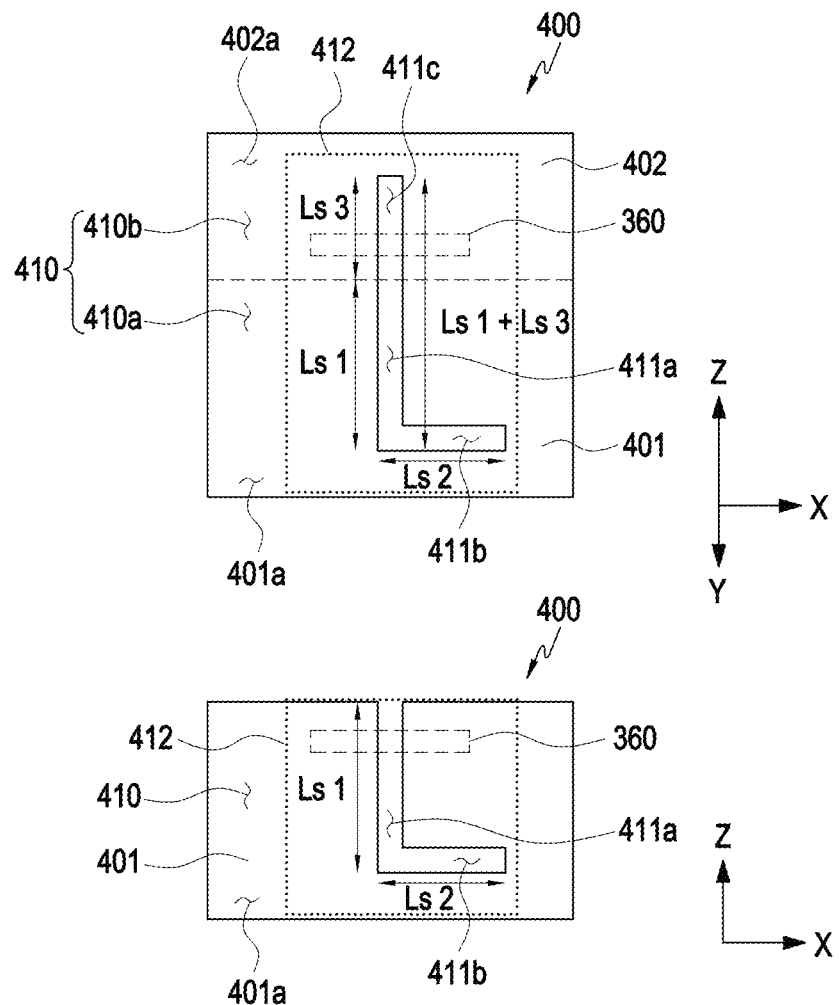
FIG. 5C illustrates various frequency operations of the antenna structure shown in FIGS. 5A and 5B, according to an embodiment.

The slot formed in the antenna structure 400 and the antenna element including the slot are described with reference to FIGS. 5A, 5B and 5C. FIG. 5A illustrates the antenna structure 400 as viewed from a first direction, according to an embodiment. FIG. 5B illustrates the antenna structure 400 as viewed from a second direction, different from the first direction of FIG. 5A, according to an embodiment. FIG. 5C illustrates various frequency operations of the antenna structure 400 shown in FIGS. 5A and 5B.

Referring to FIGS. 5A, 5B and 5C, when the side surface member 303 may include a first extension extending from the conductive portion 401, the first area 410 may include a 1-1th area 410a corresponding to the first surface 401a and a 1-2th area 410b corresponding to the second surface 402a. As used herein, such terms as "1-1th" and "1-2th" may be used to simply distinguish a corresponding component from another, and does not limit the components in other aspect (e.g., importance or order).

According to the embodiment shown in FIGS. 5A, 5B and 5C, a side surface member 303 of a housing (e.g., the housing 310 of FIG. 4) may include a conductive portion 401 and/or a first extension portion 402. Referring to FIG. 4, a second extension portion 403 may be formed in a symmetrical shape with respect to the first extension 402, based on the conductive portion 401. According to an embodiment, the second extension portion may be provided as a portion of the antenna structure or may be omitted depending on embodiments. According to an embodiment, the first extension portion 402 may face a second surface 402a different from the first surface 401a of the conductive portion 401, and the second extension portion may face a third surface different from the second surface 402a. According to an embodiment, the first surface 401a may face in the same direction as some (e.g., the side surface 303c of FIG. 3A) of the side surfaces. Further, according to an embodiment, the second surface 402a may be perpendicular to the first surface 401a. The first extension portion 402 and the second extension portion may extend from the conductive portion 401 to first side and a second side, respectively.

Referring to FIGS. 5A and 5B, a first slot 411 may be formed in the conductive portion 401 and the first extension portion 402, forming a first antenna element 412. According to an embodiment, a first portion 411a of the first slot 411 may extend from a first end of the conductive portion 401 and be formed as a slit passing through the inside portion of the conductive portion 401. A second portion 411b of the first slot 411 may extend from a second end of the first portion 411a in a direction different from the extending direction of the first portion 411a and be formed as a slit passing through the inside portion of the conductive portion 401. A third portion 411c may be formed as a slit formed on at least a portion of the first extension portion 402 in a position corresponding to the first end of the conductive portion 401 in the first extension portion 402. For example, the first portion 411a to the third portion 411c may be formed adjacent to each other, as connected slits. According to various embodiments, the first portion 411a formed in the conductive portion 401 of the first slot 411 forming the antenna element 412 may have a first length Ls1, and the second portion 411b may have a second length Ls2. The third portion 411c formed in the first extension portion 402 may have a third length Ls3. According to an embodiment, the first portion 411a having the first length Ls1 in the first slot 411 may be formed with a slit in a first direction (e.g., a direction parallel to the Z axis), the second portion 411b having the second length Ls2 in the first slot 411 may be formed with a slit in a second direction (e.g., a direction parallel to the X axis), and the third portion 411c having the third length Ls3 in the first slot 411 may be formed with a slit in a third direction (e.g., a direction parallel to the −Y axis) different from the first direction.

According to an embodiment, a feeding unit 360 may be disposed in a position adjacent to the first slot 411. According to an embodiment, as shown in FIG. 5B, the feeding unit 360 may be disposed to cross (or overlap) the first slot 411. According to an embodiment, the feeding unit 360 may coupling-feed the first antenna element 412. However, other various embodiments may be possible. As an example, although not shown in the drawings, the feeding unit 360 may contact and connect to a contact of the antenna element 412. A multi-band antenna may be implemented using a difference between the lengths reaching different two end points of the first slot 411 formed in the first antenna element 412.

Referring to FIG. 5C, if current is applied to the feeding unit 360, with the feeding unit 360 disposed adjacent to the first slot 411a and 411b, the first antenna element 412 may form a dual resonant slot antenna supporting at least two frequency bands using the first portion 411a having the first length Ls1 in the first slot 411, the second portion 411b having the second length Ls2, or the third portion 411c having the third length Ls3. For example, the portions 411a and 411c having the sum Ls1+Ls3 of the first length Ls1 and the third length Ls3 may operate as a closed slot antenna, as the conductive portion 401 and the extension portion 402 are viewed together and thus may support a low frequency band. The portion having the first length Ls1 may operate as an open slot antenna, which has an open end, as the conductive portion 401 is viewed from the front, and thus may support a high frequency band. According to various embodiments, the portions 411a, 411b, and 411c having the sum Ls1+Ls2+Ls3 of the first length Ls1, the second length Ls2, or the third length Ls3 may be used to support additional frequency bands. As such, according to various embodiments of the disclosure, it is possible to implement a multi-band antenna through the first slot 411 and to implement additional frequency bands by implementing a slot-type antenna designed in three dimensions.

Described below in detail is a L-shaped slot 411 formed by the first portion 411a having the first length Ls1 and the second portion 411b having the second length Ls2.

Figure 6:
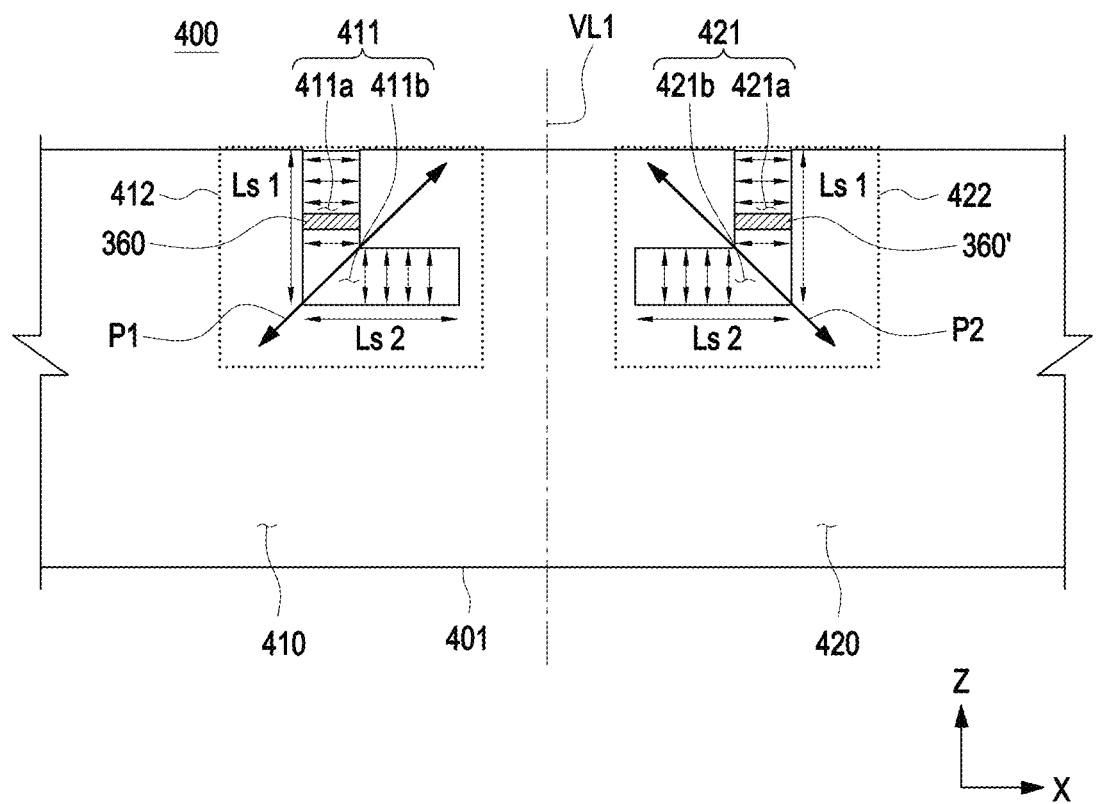
FIG. 6 illustrates an antenna structure having an L-shaped slot, according to an embodiment.

FIG. 6 illustrates an antenna structure 400 having an L-shaped slot according to various embodiments of the disclosure.

Referring to FIG. 6, when the first slot 411 is formed in the conductive portion 401 so that the first antenna element 412 is formed, the first slot 411 may include the portion 411a having the first length Ls1 and the portion 411b having the second length Ls2. According to an embodiment, the first portion 411a having the first length Ls1 in the first slot 411 may be formed with a slit in the first direction (e.g., a direction parallel to the Z axis), and the portion having the second length Ls2 may be formed with a slit in a second direction (e.g., a direction parallel to the X axis) different from the first direction. The first length Ls1 and the second length Ls2 may be set to vary depending on the frequency bands supported by the antenna structure 400. As an example, the first length Ls1 and the second length Ls2 may be the same as shown in FIG. 6 or may be different.

In the embodiment of FIG. 6, a feeding unit 360 may be disposed in a position adjacent to the first slot 411. If the first antenna element 412 is coupled by the current applied from the feeding unit 360, the first antenna element 412 may resonate according to the frequency band corresponding to the parameters (e.g., parameters related to the first length Ls1 and the second length Ls2) defining the first slot 411. Since at least two parameters define the first slot 411, it is possible to support a multi-band frequency band through one slot. For example, the antenna elements 412 and 422 may resonate according to the frequency bands corresponding to the parameters related to the first length Ls1, the second length Ls2, and the third length Ls3.

According to an embodiment, the antenna structure 400 may be formed with a second slot 421 in addition to the first slot 411. The second slot 421 may extend in the first length Ls1 in the first direction (e.g., a direction parallel to the Z axis) and extend in the second length Ls2 in the third direction (e.g., a direction parallel to the −X axis) different from the second direction. According to an embodiment, a fourth portion 421a extending from the second slot 421 in the first length Ls1 may be parallel to a portion 411a extending in the first length Ls1 in the first slot 411. In another embodiment, a fifth portion 421a extending in the second length Ls2 in the second slot 421 may face in a direction opposite to the second portion 411b extending in the second length Ls2 in the first slot 411. For example, the second direction may be opposite to the third direction. For example, when the second direction is parallel to the X axis (e.g., the X axis of FIG. 6), the third direction may be set to be parallel to the −X axis.

In an embodiment, the first slot 411 and the second slot 421 may overall have an L shape as the conductive portion 401 is viewed from the front. The portions extending in the second length Ls2 in the first slot 411 and the second slot 421 may be formed to face each other as in the embodiment shown in FIG. 6 or may be disposed to face in opposite directions to each other as in the embodiment shown in FIG. 7A described below.

According to an embodiment, the first slot 411 may be disposed in a first area 410 of the conductive portion 401 of the side surface member 303, and the second slot 421 may be disposed in a second area 420 of the conductive portion 401 of the side surface member 303. In an embodiment, the first area 410 and the second area 420 may be a first side area and a second side area on the side surface member 303, divided with respect to a virtual line VL1 passing through the conductive portion 401 of the side surface member 303. For example, the virtual line VL1 may pass through the center of the conductive portion 401. The side surface member 303 may include two or more divided areas. Here, two or more areas may be distinguished from each other through a certain physical boundary, but may also be simply distinguished through a virtual line that is not implemented in an actual product. For example, a virtual line (e.g., the virtual line VL2 of FIG. 16) passing through the side surface member 303 may divide the conductive portion 401 into an upper and lower portion which may corresponding to the first area 410 and the second area 420, respectively. As another example, a virtual line (e.g., the virtual line VL1) passing through the side surface member 303 and parallel to the Y axis may divide the conductive portion 401 into a left and right portion which may correspond to the first area 410 and the second area 420, respectively.

According to an embodiment, the first slot 411 and the second slot 421 may be electrically connected with a first feeding unit 360 and a second feeding unit 360', respectively. For example, the first feeding unit 360 may include a first conductive line in a form crossing a portion of the first slot 411, and the second feeding unit 360' may include a second conductive line in a form crossing a portion of the second slot 421. The first feeding unit 360 and the second feeding unit 360' may apply a first phase signal or a second phase signal to the first slot 411 and the second slot 421 through the first conductive line and the second conductive line. According to an embodiment, the first feeding unit 360 may be designed to be capable of feeding independent from the second feeding unit 360' so that the first phase signal applied from the first feeding unit 360 has a designated phase difference from the second phase signal applied from the second feeding unit 360'.

According to an embodiment, if the first slot 411 is formed in an L shape, when a signal is applied from the first feeding unit 360, a horizontal polarization may be generated at the first portion 411a having the first length Ls1, and a vertical polarization may be generated at the second portion 411b having the second length Ls2. Accordingly, the first slot 411 may form a composite polarization P1 inclined at a predetermined angle (e.g., 45 degrees) with respect to the second portion 411b overall having the second length (e.g., Ls2 of FIG. 6). In the same principle, a composite polarization P2 may be formed at the second slot 421.

Figure 7A:
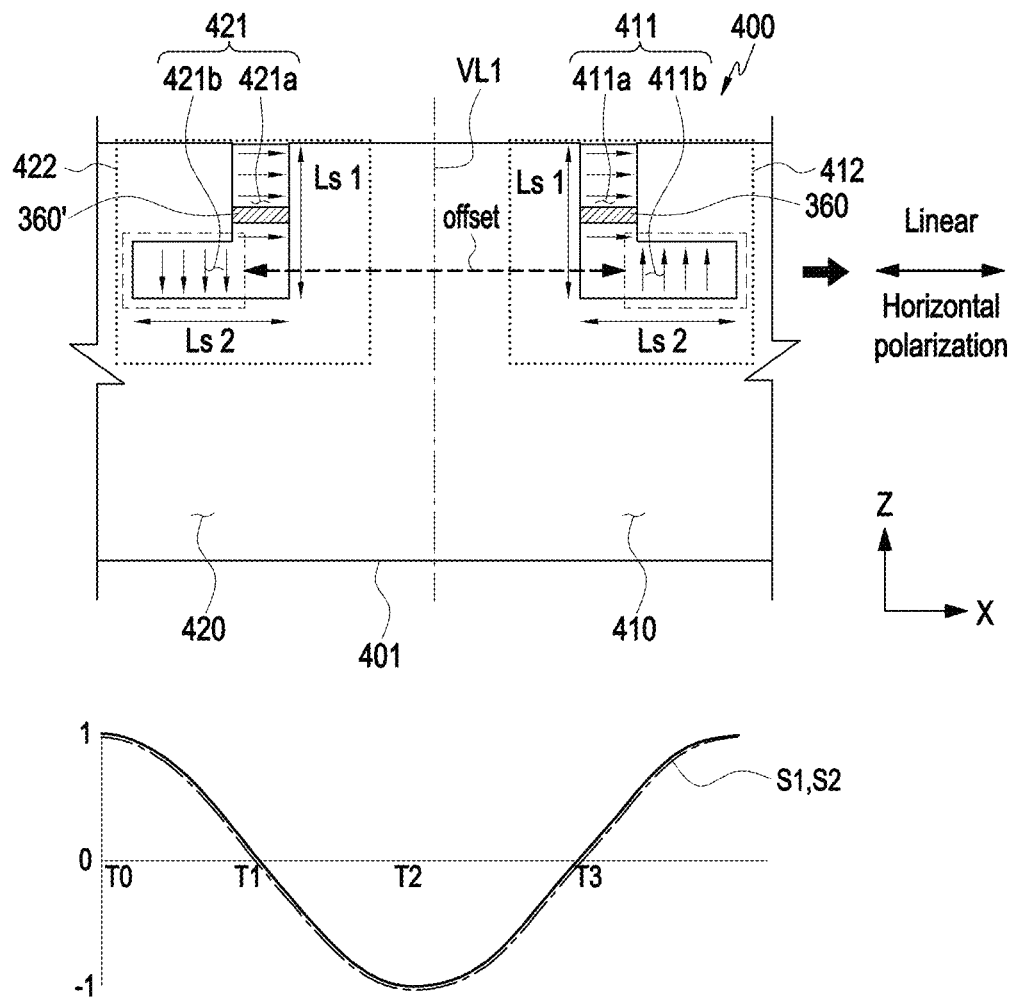
FIG. 7A illustrates an antenna structure forming a horizontal polarization according to an embodiment.
Figure 7B:
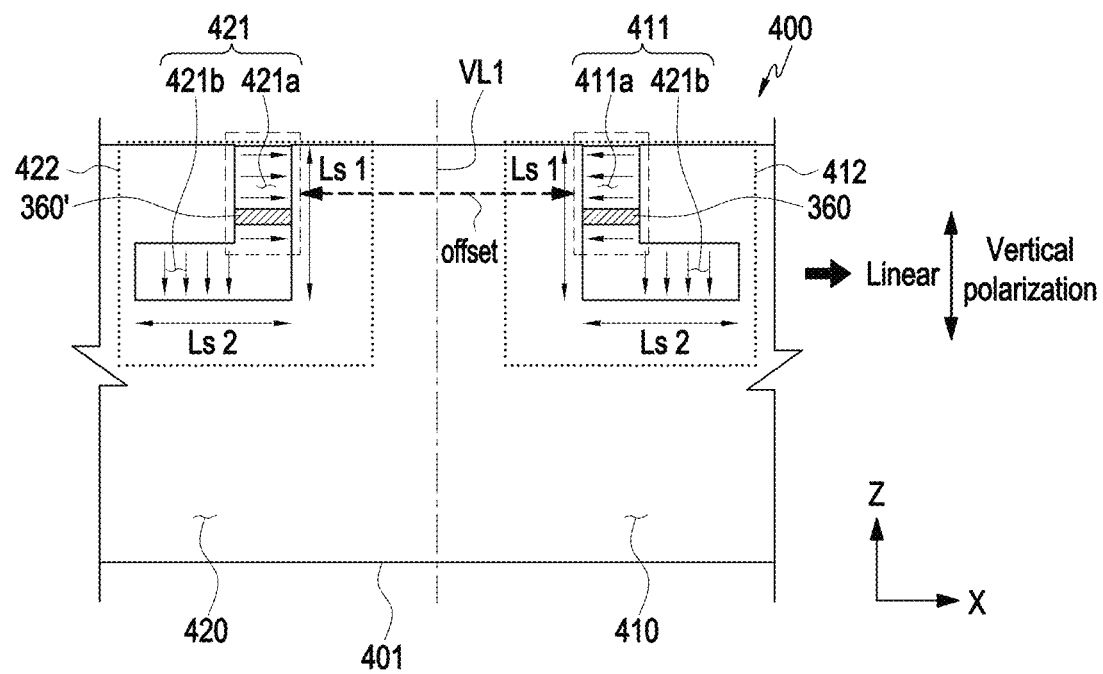
FIG. 7B illustrates an antenna structure forming a vertical polarization according to an embodiment.
Figure 7B:
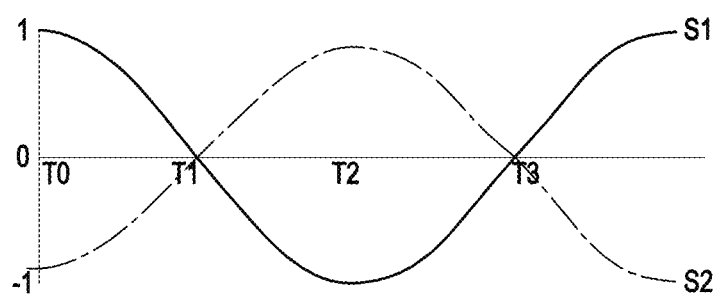

Referring to FIGS. 7A and 7B, described below in detail are various aspects in which a polarization is formed according to a phase difference between the first phase signal and the second phase signal when the first slot 411 and the second slot 421 are formed in the first area 410 and the second area 420, respectively, in the conductive portion 401.

Figure 7C:
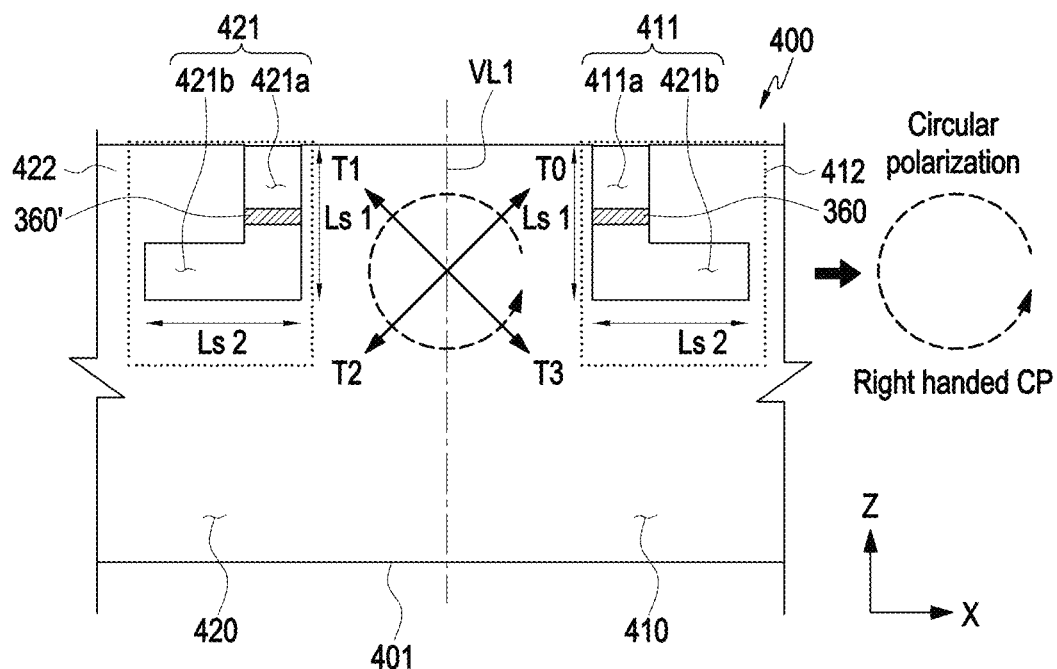
FIG. 7C illustrates an antenna structure forming a circular polarization according to an embodiment.
Figure 7C:
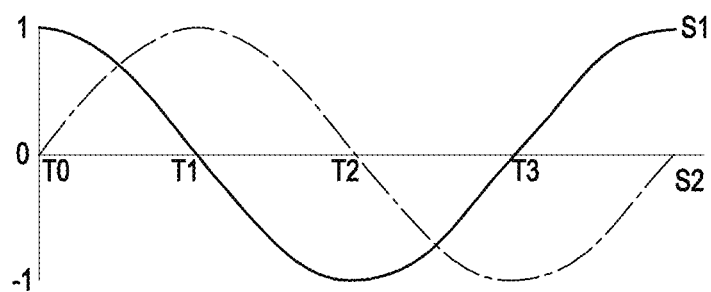
Figure 7D:
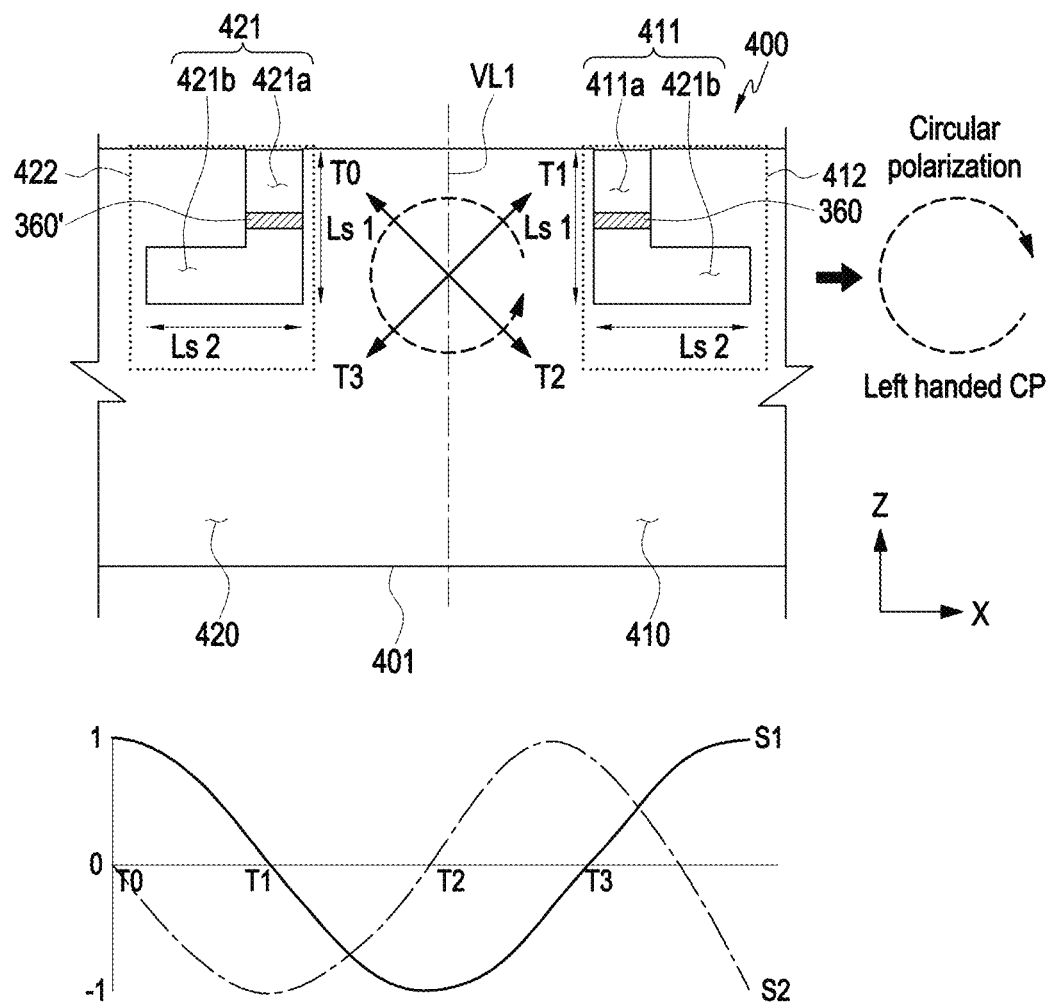
FIG. 7D illustrates an antenna structure forming a circular polarization according to an embodiment.

FIG. 7A illustrates an antenna structure 400 forming a horizontal polarization according to an embodiment. FIG. 7B illustrates an antenna structure 400 forming a vertical polarization according to an embodiment. FIG. 7C illustrates an antenna structure 400 forming a circular polarization according to an embodiment. FIG. 7D illustrates an antenna structure 400 forming a circular polarization according to an embodiment.

FIGS. 7A, 7B, 7C and 7D illustrate a first antenna element 412 including a first slot 411 formed in a conductive portion 401 of a side surface member 303 and a second antenna element 422 including a second slot 421 formed in the conductive portion 401 of the side surface member 303.

According to various embodiments, the antenna structure 400 may include the first antenna element 412 and the second antenna element 422.

As an embodiment, a first area 410 and a second area 420 are divided with respect to a virtual line VL1 passing through the conductive portion 401 of the side surface member 303. The first slot 411 may be formed in the first area 410, and the second slot 421 may be formed in the second area 420, symmetrically with the first slot 411.

According to the embodiment shown in FIG. 7A, the first phase signal applied from the first feeding unit 360 may be set to have the same phase as the second phase signal applied from the second feeding unit 360'. In this case, in the first slot 411 of the antenna structure 400, a horizontal polarization in the X-axis direction may be generated at the first portion 411a having the first length Ls1, and a vertical polarization in the Z-axis direction may be generated at the second portion 411b having the second length Ls2. In the second slot 421 of the antenna structure 400, a horizontal polarization in the X-axis direction may be generated at the fourth portion 421a having the first length Ls1, and a vertical polarization in the −Z-axis direction may be generated at the fifth portion 421b having the second length Ls2. The aforementioned polarization directions indicate the directions in which the polarizations are first generated when the phase signals are applied. However, the disclosure is not limited thereto. From a point of view of the composite polarization of the entire antenna structure 400, the vertical polarization in the Z-axis direction and the vertical polarization in the −Z-axis direction, formed simultaneously, are canceled out by destructive interference, and the horizontal polarization in the X-axis direction may be reinforced. If the first phase signal S1 and the second phase signal S2 having the same phase are applied as the composite polarization of the entire antenna structure 400, the horizontal polarization in the X-axis direction or −X-axis direction may be alternately generated over time, but the vertical polarizations may be offset. As such, when signals with the same phase are applied to the first feeding unit 360 and the second feeding unit 360', the composite polarization of the entire antenna structure 400 may have only the horizontal polarization component.

According to the embodiment shown in FIG. 7B, the first phase signal S1 applied from the first feeding unit 360 may be set to have a phase which is 180 degrees different from the second phase signal S2 applied from the second feeding unit 360'. In this case, in the first slot 411 of the antenna structure 400, a horizontal polarization in the X-axis direction may be generated at the first portion 411a having the first length Ls1, and a vertical polarization in the −Z-axis direction may be generated at the second portion 411b having the second length Ls2. In the second slot 421 of the antenna structure 400, a horizontal polarization in the X-axis direction may be generated at the portion having the first length Ls1, and a vertical polarization in the −Z-axis direction may be generated at the portion having the second length Ls2. From a point of view of the composite polarization of the entire antenna structure 400, the horizontal polarization in the −X-axis direction and the horizontal polarization in the X-axis direction, formed simultaneously, may be canceled out by destructive interference, and the vertical polarization in the −Z-axis direction may be reinforced. If the first phase signal S1 and the second phase signal S2 having the 180-degree phase difference are applied, as the polarization (composite polarization) of the entire antenna structure 400, the vertical polarization in the Z direction or −Z direction may be alternately generated over time, but the horizontal polarizations may be offset. As such, when signals with the 180-degree phase difference are applied to the first feeding unit 360 and the second feeding unit 360', the composite polarization of the entire antenna structure 400 may have only the vertical polarization component.

According to the embodiment shown in FIG. 7C, the first phase signal S1 applied from the first feeding unit 360 may be set to have a phase which is 90 degrees different from the second phase signal S2 applied from the second feeding unit 360'. If the first phase signal S1 and the second phase signal S2 having the 90-degree phase difference are applied, the composite polarization of the entire antenna structure 400, as a circular polarization combining a horizontal polarization and a vertical polarization, may change to a counter-clockwise direction over time.

In FIG. 7D, the first phase signal S1 applied from the first feeding unit 360 may be set to have a phase which is −90 degrees different from the second phase signal S2 applied from the second feeding unit 360'. If the first phase signal S1 and the second phase signal S2 having the −90-degree phase difference are applied, the composite polarization of the entire antenna structure 400, as a circular polarization combining the horizontal polarization and the vertical polarization, may change to a clockwise direction overtime.

According to the embodiment shown in FIGS. 7A, 7B, 7C and 7D, disclosed is the antenna structure 400 having the L-shaped first slot 411 and the second slot 421 symmetrical in shape with the first slot 411 with respect to the virtual line passing through the center of the conductive portion 401. Polarizations in various shapes and sizes may be generated through the antenna structure 400.

Figure 8:
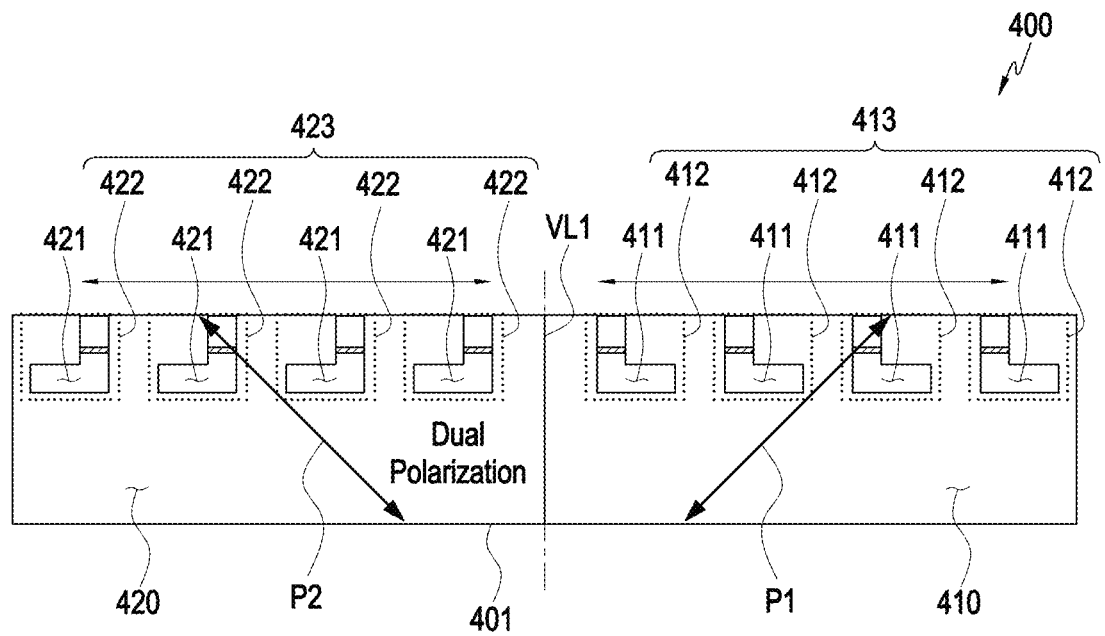
FIG. 8 illustrates an array antenna according to an embodiment.
Figure 9:
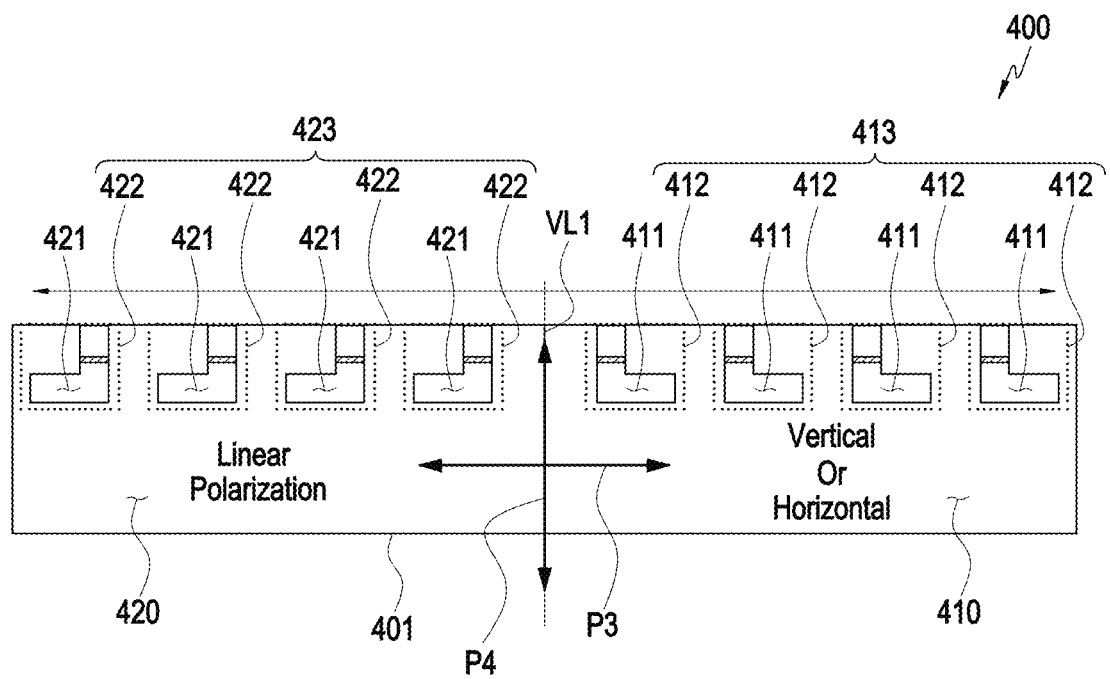
FIG. 9 illustrates an array antenna generating a polarization as an array antenna according to an embodiment.

FIG. 8 illustrates an array antenna according to an embodiment. FIG. 9 illustrates an array antenna generating a polarization as an array antenna according to an embodiment.

Referring to FIG. 8, a plurality of first antenna elements 412 including at least one first slot 411 may be provided in a first array antenna 413. In an embodiment, if the plurality of first antenna elements 412 are arranged in a predetermined direction (e.g., a direction parallel to the X axis of FIG. 4), it is possible to form a beam in a specific direction by adjusting the phase of the signal (or current) applied to the first antenna elements 412. The plurality of first antenna elements 412 may be disposed by each designated interval (e.g., a first interval), and various settings may be made thereto. As the same phase signal is applied to each of the plurality of first antenna elements 412, the first array antenna 413 may generate a stronger polarization than a polarization formed by an I-shaped slot. For example, a composite polarization P1 may be generated by a certain signal applied to the first array antenna 413. The composite polarization P1 may have a stronger output than a composite polarization P1 generated through one first antenna element 412.

In FIG. 9, plurality of antenna elements 422 including at least one second slot 421 may be included in a second array antenna 423. The plurality of second antenna elements 422 may be disposed by each designated interval (e.g., a second interval), and various settings may be made thereto according to embodiments. In an embodiment, the interval between the plurality of second antenna elements 422 may be set to be equal to the interval between the plurality of first antenna elements 412. As another example, the same phase signal may be applied to each of the plurality of second antenna elements 422. Thus, the second array antenna 423 may generate a stronger polarization than a polarization generated by a single slot. For example, the composite polarization P2 generated by the signal applied to the second array antenna 423 may have a stronger output than a composite polarization P2 generated through one second antenna element 422 shown in FIG. 6A.

As shown in FIG. 8, different composite polarizations P1 and P2 may be generated using the first array antenna 413 and the second array antenna 423. The different composite polarizations P1 and P2 may be varied independently through independent feeding. For example, it is possible to adjust each of the direction and size of the different composite polarizations P1 and P2 by shifting the phase of the first phase signal S1 and the second phase signal S2 as in FIGS. 7C and 7D. According to various embodiments of the disclosure, dual polarization may be formed using the first array antenna 413 and the second array antenna 423.

Referring to FIG. 9, in the same antenna structure 400 as that shown in FIG. 8, different forms of composite polarizations P3 and P4, e.g., single polarizations, may be formed. As in FIGS. 7A and 7B, if the phase of the first phase signal and the second phase signal is shifted, a composite polarization P4 having only vertical component or a composite polarization P3 having only horizontal component may be generated. According to various embodiments of the disclosure, it is possible to implement an antenna structure 400 generating a single polarization, as well as an antenna structure 400 generating dual polarization by properly adjusting the first phase signal and the second phase signal.

According to an embodiment, in a specific environment where the electronic device (e.g., the electronic device 300 of FIG. 3A is placed), it is possible to allow the antenna structure 400 to generate either single polarization or dual polarization according to the electric field (or electric field strength) representing the signal strength. For example, in a strong electric field (e.g., reference signal received power (RSRP) of at least about −84 decibel milliwatts (dBm), the first array antenna 413 and the second array antenna 423 may be operated as having different dual polarization antenna operation to perform multiple input multiple output (MIMO) transmission/reception, thereby maximizing data transmission amount. As another example, in a weak electric field (e.g., reference signal received power (RSRP) of about −85 dBm or less), the first array antenna 413 and the second array antenna 423 may be operated as having the same polarization (single polarization antenna operation) to form a polarization with a larger gain than the dual polarization antenna operation.

Figure 10A:
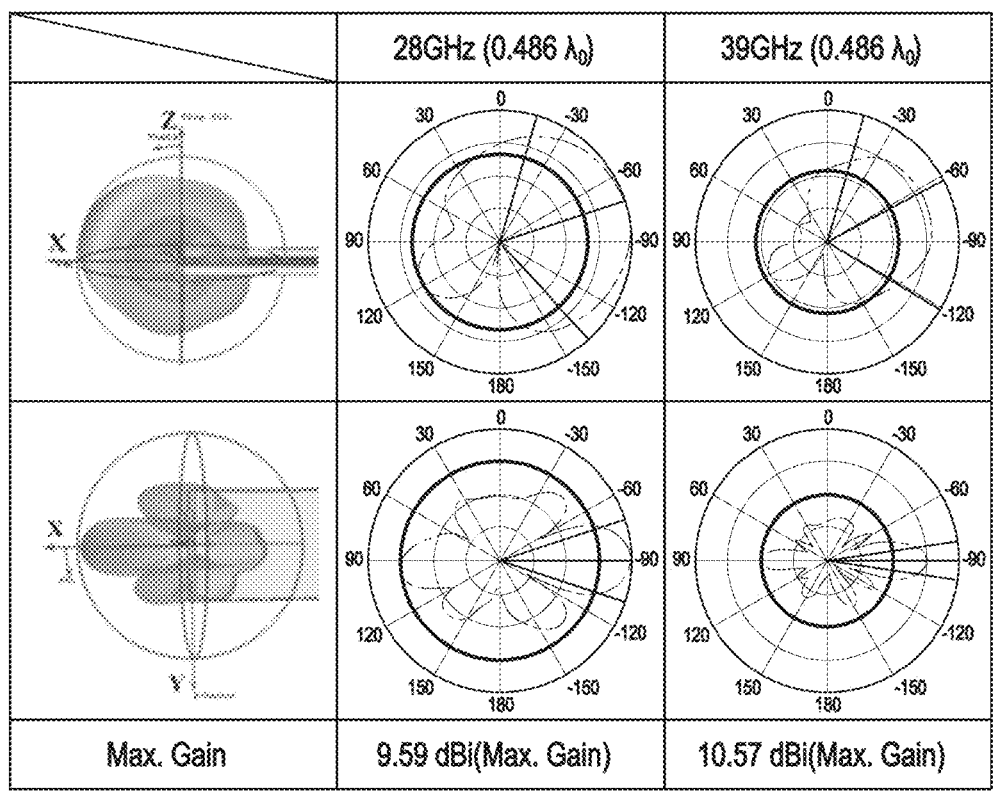
FIG. 10A illustrates a gain of a 1×4 array antenna, according to an embodiment.
Figure 10B:
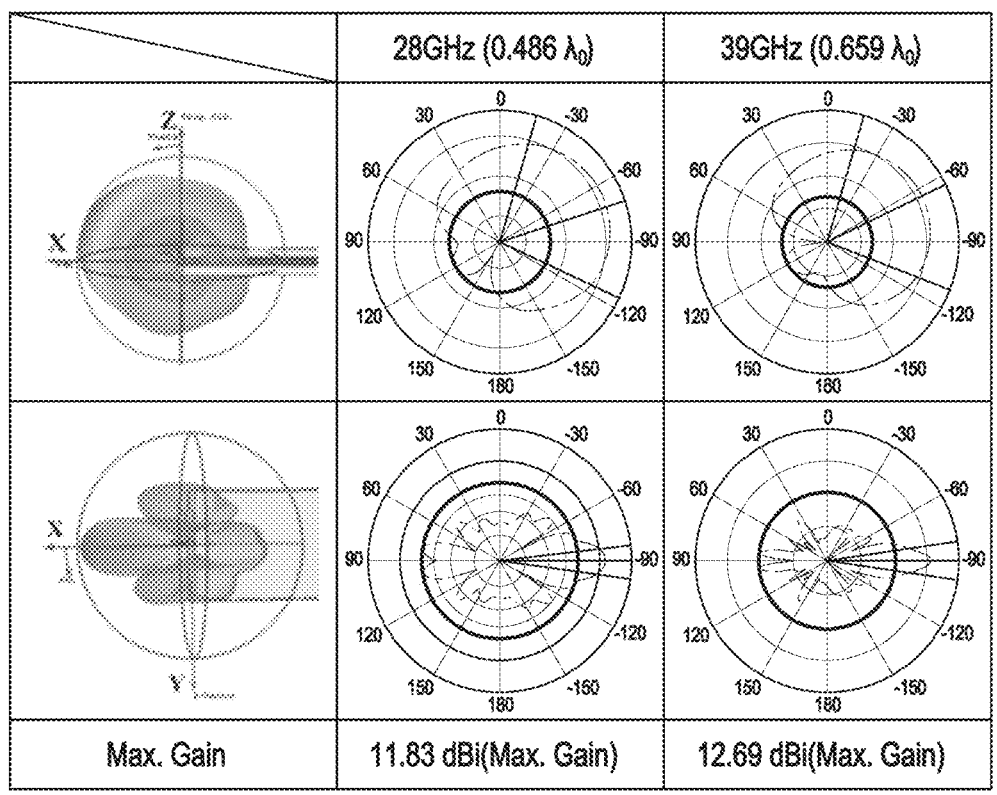
FIG. 10B illustrates a gain of a 1×8 array antenna, according to an embodiment.

FIG. 10A illustrates the gain of a 1×4 array antenna, according to an embodiment. FIG. 10B illustrates the gain of a 1×8 array antenna, according to an embodiment.

Referring to FIGS. 8 and 10A, the gain of the beam radiated through the first array antenna 413 of FIG. 8 is a maximum gain of 9.59 decibels isotropic (dBi) in the 28 GHz frequency band and a maximum gain of 10.57 dBi in the 39 GHz frequency band as shown in FIG. 10A.

In contrast, referring to FIGS. 9 and 10B, when the first array antenna 413 and the second array antenna 423 of FIG. 9 together form a single polarization, the gain of the beam radiated thereby is a maximum gain of 11.83 dBi in the 28 GHz frequency band and a maximum gain of 12.69 dBi in the 39 GHz frequency band as shown in FIG. 10B.

Thus, about a 2.1 to 2.3 dBi higher gain may be obtained when polarization is formed using two different array antennas (e.g., the first array antenna 413 and the second array antenna 423) as shown in FIG. 9 as compared with forming polarization using only one array antenna (e.g., the first array antenna 413).

According to various embodiments of the disclosure, it is possible to properly adjust the first phase signal S1 applied to the first array antenna 413 and the second phase signal S2 applied to the second array antenna 423. For example, the antenna structure 400 may operate as an appropriate antenna depending on the signal strength, as an antenna element generating dual polarization when the signal strength is good, and an antenna element generating single polarization when the signal strength is poor.

Figure 11:
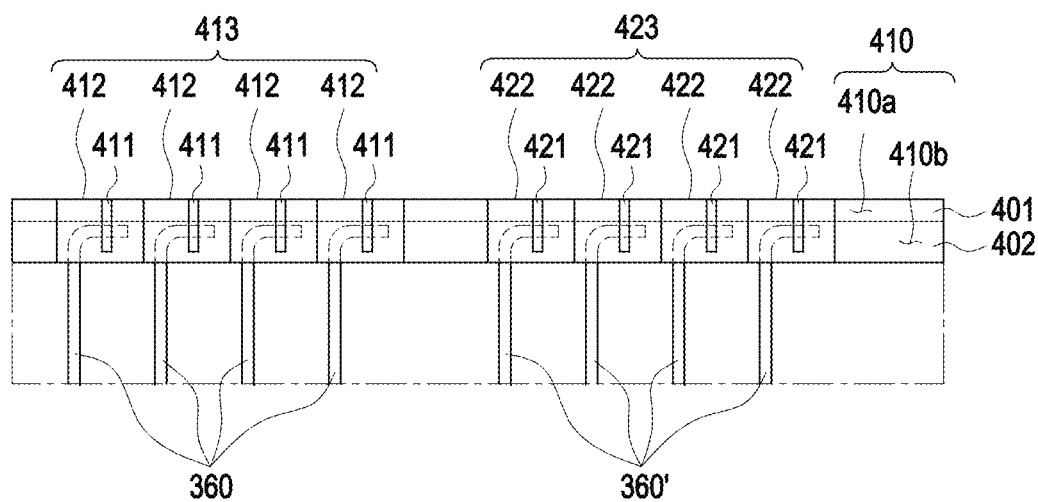
FIG. 11 illustrates an appearance of an antenna structure and a feeding unit according to an embodiment.

FIG. 11 illustrates an appearance of an antenna structure 400 and feeding units 360 and 360' according to an embodiment.

FIG. 11 illustrates feeding units 360 and 360' connected to a plurality of first slots 411 and a plurality of second slots 421, according to an embodiment.

It should be noted that the feeding units 360 and 360' of FIG. 11 are merely exemplified for convenience of description. The feeding units 360 and 360' of FIG. 11 may be formed to have different conductive paths from those shown.

Referring to FIG. 11, according to an embodiment, a first feeding unit 360 may be disposed adjacent to the first antenna element 412 including the first slots 411. According to various embodiments, when viewed from above the first extension portion 402, the first antenna element 412 may couple with the conductive line (e.g., the first conductive line) of the first feeding unit 360 crossing at least some of the plurality of first slots 411 or touch a contact of the first antenna element 412 to be fed power. The second feeding unit 360' may be disposed adjacent to the second antenna element 422 including the plurality of second slots 421. According to various embodiments, when viewed from above the second extension portion 402, the second antenna element 422 may couple with the conductive line (e.g., the second conductive line) of the second feeding unit 360' crossing at least some of the plurality of second slots 421 or touch a contact of the second antenna element 422 to be fed power. The first feeding unit 360 and the second feeding unit 360' may be connected with an RFIC (e.g., the third RFIC (e.g., 226 in FIG. 2)). According to an embodiment, the first feeding unit 360 and the second feeding unit 360' may be connected to two different RFICs to be independently fed power. As another example, one RFIC may include a plurality of RF chains corresponding to the number of the antenna elements and may be connected to the antenna elements through independent feeding through the plurality of RF chains. Thus, the first array antenna 413 formed by the plurality of first slots 411 and the second array antenna 423 formed by the plurality of second slots 421 may be independently fed by the first feeding unit 360 and the second feeding unit 360', respectively.

According to an embodiment, the plurality of conductive lines included in the first feeding unit 360 and the second feeding unit 360', respectively, may enable power feeding with a single pole double through (SPDT) switching structure. According to another example, the feeding unit 360 and the second feeding unit 360' each may be configured to directly connect with a communication circuit, such as an RFIC. The first feeding line (not shown) and the second feeding line (not shown) may also be designed to be hybrid beamformed by integrating direct connections with the SPDT or RFIC.

According to various embodiments, the first feeding unit 360 and the second feeding unit 360' may include a first conductive line and a second conductive line, respectively, and the conductive lines may be disposed in a space surrounded by the first plate, second plate, and side surface member 303 in the electronic device (e.g., the electronic device 300 of FIG. 3A).

Figure 12:
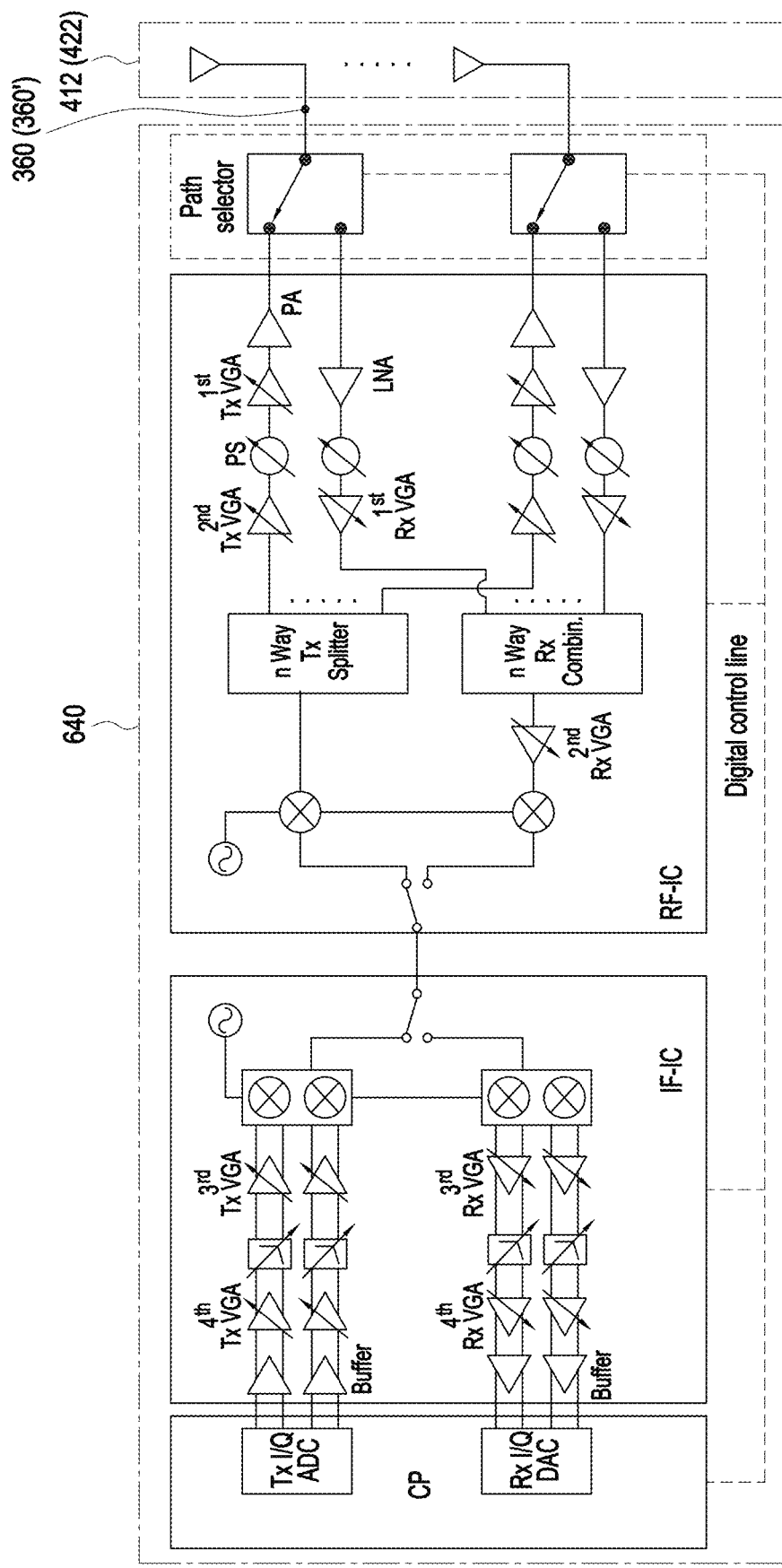
FIG. 12 illustrates a beamforming communication circuit having n chains and capable of processing one data stream, according to an embodiment

FIG. 12 illustrates a beamforming communication IC 640 having n chains and capable of processing one data stream, according to an embodiment.

Referring to FIGS. 12A, 12B and 12C, the digital control line inside the communication circuit 640 is omitted. The digital control line of the CP/IF-IC/RF-IC/Switch may include such known interfaces as mobile industry processor interface (MIPI), inter-integrated circuit (I2C), peripheral component interconnect express (PCIe), universal asynchronous receiver transmitter (UART), USB or general purpose input output (GPIO).

Referring to FIG. 12, n chains are arranged apart by a designated interval. In an embodiment, a number of chains corresponding to the number of antenna elements 412 and 422 shown in FIG. 11 may be included in the communication circuit (e.g., RFIC) and may be connected with a switch (path selector). The switch (path selector) may selectively connect to the Tx chain upon transmission Tx and, to the Rx chain upon reception Rx during time division duplex (TDD) communication.

According to an embodiment, the transmission chain may include, in an RF-IC, a power amplifier (PA), a first variable gain amplifier (VGA), a phase shifter, a second variable gain amplifier (VGA), an n-channel transmission splitter (n-way Tx splitter), or a mixer.

The PA may perform large power amplification for the Tx signal. The PA may be mounted inside or outside the RF-IC. Each VGA may be controlled by the communication processor (CP) to perform Tx auto gain control (AGC). The number of the VGAs may be increased or decreased depending on the case. The PS may shift the phase of the signal according to the beamforming angle under the control of the communication processor (CP). The n-channel transmission splitter (n-way Tx splitter) may split the Tx signal received from the mixer into n signals. The mixer may upconvert the Tx-IF (transmission intermediate frequency) received from the IF-IC (intermediate frequency processing integrated circuit) into the Tx signal (RF band). The mixer may receive signals that are to be combined from the internal or external oscillator.

According to an embodiment, the reception chain may include, in an RF-IC, a low-noise amplifier (LNA), a PS, a first VGA, an n-channel reception combiner (n-way Rx combiner), a second Rx VGA, or a mixer.

The low-noise amplifier (LNA) may perform low-noise amplification on the signal received from the antenna. Each VGA may be controlled by the communication processor (CP) to perform RX auto gain control (AGC). The number of the VGAs may be increased or decreased depending on the case. The PS may shift the phase of the signal according to the beamforming angle under the control of the communication processor (CP). The n-channel reception combiner (n-way Rx combiner) may combine signals aligned in phase by being phase-shifted. The combined signal may be transferred to the mixer via the second VGA. The mixer may down-convert the received signal from the RF band to the IF band. The mixer may receive signals that are to be combined from the internal or external oscillator.

According to an embodiment, a switch for selectively connecting the Rx/Tx chain to the rear end of the mixer in the RF-IC may be further included. If the IF frequency is high, it may be difficult to connect the transmission line between RF-IC/IF-IC. If the Tx/Rx chains are selectively connected by the switch during time division duplex (TDD) communication operation, the number of RF-IC/IF-IC transmission lines may be reduced.

According to various embodiments, the IF-IC may include a switch selectively connecting the Rx/Tx chains. The Tx chain inside the IF-IC may include a quadrature mixer, a third VGA, a low pass filter (LPF), a fourth VGA, or a buffer. The buffer buffers the signal upon receiving the balanced Tx I/Q signal from the communication processor (CP), thereby enabling stable signal processing. The third VGA and the fourth VGA may serve as a Tx AGC under the control of the CP. The LPF may serve as a channel filter by operating the bandwidth of the baseband Tx IQ signal as the cutoff frequency. The cutoff frequency is variable. The quadrature mixer may upconvert the balanced Tx I/Q signal to the Tx-IF signal.

According to various embodiments, the Rx chain inside the IF-IC may include a quadrature mixer, a third VGA, an low pass filter (LPF), a fourth VGA, or a buffer. The buffer buffers the signal upon transmission of the balanced Rx I/Q which has undergone the fourth VGA, thereby enabling stable signal processing. The third VGA and the fourth VGA may serve as Rx AGC under the control of the CP. The LPF may serve as a channel filter by operating the bandwidth of the baseband balanced Rx IQ signal as the cutoff frequency. The cutoff frequency is variable. The quadrature mixer may down-convert the Rx-IF signal into the balanced Rx I/Q signal.

The Tx I/Q DAC in the communication processor (CP) may convert the digital signal modulated by the modem into the balanced Tx I/Q signal and transfers the same to the IF-IC. The Rx I/Q ADC in the communication processor (CP) may convert the balanced Rx I/Q signal down-converted by the IF-IC into a digital signal and transfer the signal to the modem.

The above-described configuration of the communication circuit 640 may be connected with each chain (e.g., individual slots constituting the array antenna) of the antenna element through the feeding units 360 and 360'. Thus, it is possible to implement massive multi-input multi-output (massive MIMO) or full dimensional MIMO (FD-MIMO) communication or diversity (spatial diversity) according to the environment of the communication channel.

Figure 13A:
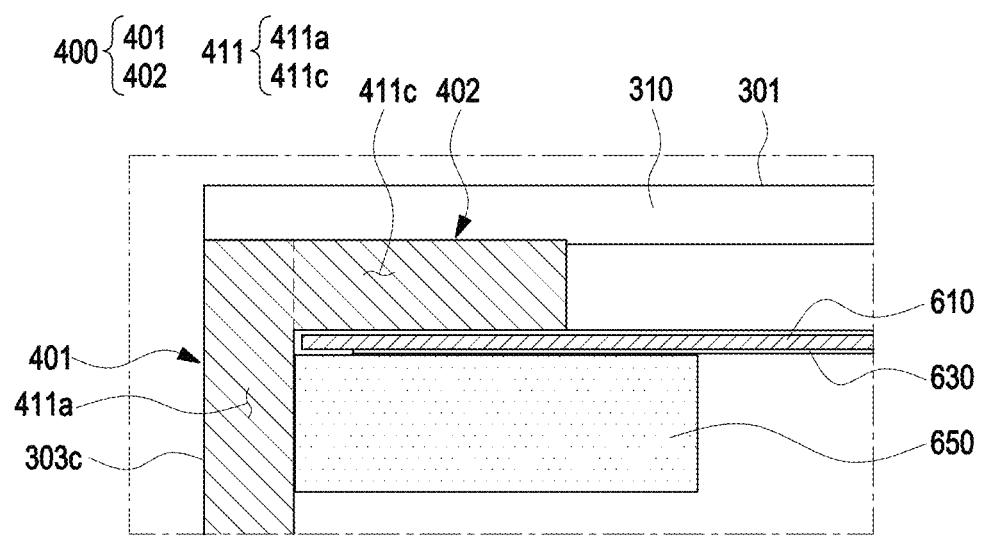
FIG. 13A illustrates a connection structure between an antenna structure and a circuit board according to an embodiment.
Figure 13B:
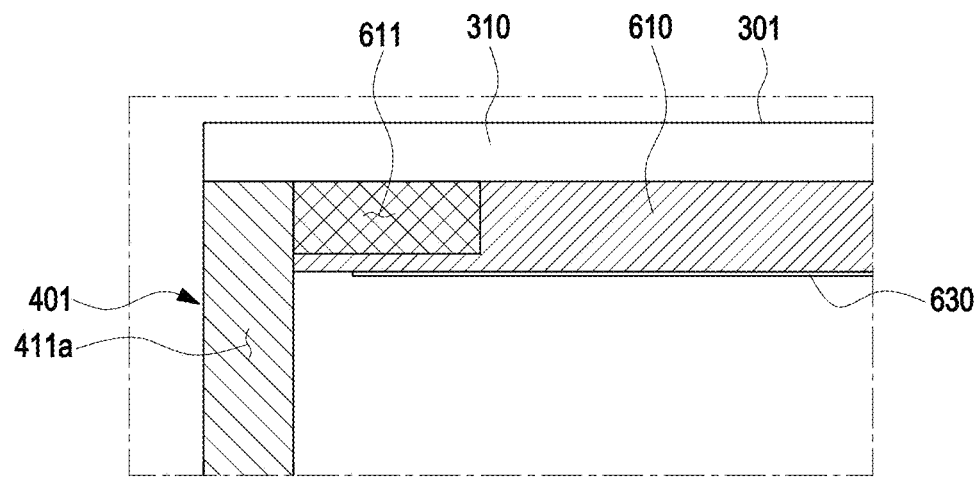
FIG. 13B illustrates a connection structure between an antenna structure and a circuit board according to an embodiment.
Figure 13C:
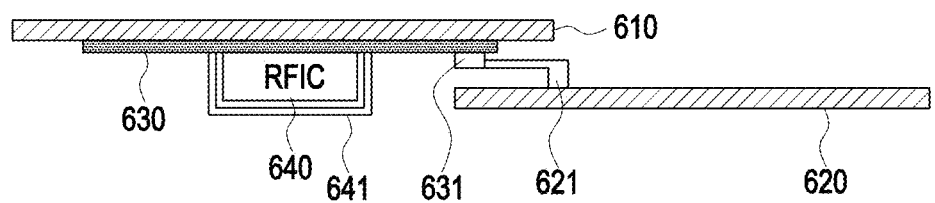
FIG. 13C illustrates a configuration of a circuit board including a 5G module according to an embodiment.

FIG. 13A illustrates a connection structure between an antenna element and a first circuit board 610 according to an embodiment. FIG. 13B illustrates a connection structure between an antenna element and a first circuit board 610 according to an embodiment. FIG. 13C illustrates a configuration of a circuit board including an antenna module according to an embodiment.

The feeding unit 360 described above in connection with FIG. 11 may be connected to the first circuit board 610 and a conductive path 630 formed on or under the circuit board or may include, as its part, the first circuit board 610 and the conductive path 630 formed on or under the first circuit board 610. At least one communication circuit (e.g., RFIC) may be disposed on the first circuit board 610. The conductive path 630 may have a patterned wire shape and may be designed to have a microstrip line or a substrate integrated waveguide (SIW) shape.

Referring to FIG. 13A, the antenna structure 400 may include a conductive portion 401 of a side surface member 303 facing a first surface 401a and a first extension portion 402 facing a second surface 402a in a direction different from the first surface 401a (and/or a second extension portion (e.g., the second extension portion 503 of FIG. 15) facing a third surface (not shown)) According to an embodiment, the circuit board may be connected to the first extension portion 402 (and/or the second extension portion), instead of to the conductive portion 401 of the side surface member 303. The connection may include a physical connection as well as an electrical connection.

According to various embodiments, at least one slot among a plurality of slots (e.g., the first slot 411 of FIG. 9) may be formed in the conductive portion 401 and the first extension portion 402 of the side surface member 303. In an embodiment, the slot may be filled with a dielectric (e.g., a polymer material).

According to various embodiments, the electronic device (e.g., the electronic device 300 of FIG. 3A) including the antenna structure 400 may further include a fixing portion 650 inside the housing 310. The fixing portion 650 may include, e.g., an injection-molded fixing portion or a bracket. The fixing portion 650 may be disposed adjacent to a side surface member (e.g., an inner side surface of the conductive portion 401) of the antenna structure 400 (e.g., an inner surface of the conductive portion 401) and may be disposed adjacent to a lower portion of the first circuit board 610. The fixing portion 650 may stably support the antenna structure 400 and/or the first circuit board 610.

According to various embodiments, in FIG. 13A, the conductive portion 401 and/or the first extension portion 402 may substantially correspond to a partial configuration of the housing 310. FIG. 13A illustrates that at least a portion (e.g., the first portion 411a and/or the third portion 411c) of the first slot 411 is formed in the conductive portion 401 and/or the first extension portion 402, substantially as a portion of the housing 310.

FIG. 13B illustrates an embodiment of extending a slot even without forming the first extension portion 402. According to the embodiment shown in FIG. 13B, in addition to the slot 411a formed in the conductive portion 401, a slot 611 is formed in one side of the circuit board 610, thus implementing an effect of a slot extending from the slot 411a. According to an embodiment, the slots 411a and 611 may also be filled with a dielectric material (e.g., a polymer material).

Referring to FIG. 13C, the circuit board may include a first circuit board 610 (e.g., the circuit board of the third antenna module 246) on which at least one conductive path 630 is formed and a second circuit board 620 connected with the first circuit board 610 through connection units 621 and 631 (e.g., a coaxial cable or FPCB). Here, in the first circuit board 610, a communication circuit 640 (e.g., the third RFIC 226) may be mounted to a position adjacent to the antenna element to reduce propagation path loss. In an embodiment, the second circuit board 620 may be a main circuit board on which a processor (e.g., the processor 120 of FIG. 1) for controlling the signal flow of the communication circuit 640 is mounted. According to various embodiments, the first circuit board 610 may be an auxiliary circuit board having a structure (e.g., a cavity backed model) that shields the communication circuit 640 off through a shield can 641. According to an embodiment, the communication circuit 640 may include various amplifiers (AMP) for increasing transmission/reception signal quality, filter circuits (channel filters), or phase shifter circuits for phase difference feeding.

According to various embodiments of the disclosure, as the conductive portion 401 and the first extension portion 402 extending from the conductive portion 401 are formed, it is possible to connect the first circuit board 610 equipped with at least one conductive path 630 and communication circuit 640 to the first extension portion 402. According to an embodiment, the first extension portion 402 of the antenna structure 400 may be coupled with the first circuit board 610 on which the communication circuit 640 is provided and one conductive path 630 and may be fed power.

Referring to FIGS. 11 to 13C, it is possible to perform various array antenna modes using the antenna structure 400 and the feeding units 360 and 360' according to various embodiments of the disclosure. According to various embodiments, in the antenna structure 400, when a plurality of first slots 411 are formed in the first area 410 to form a first array antenna 413, and a plurality of second slots 421 are formed in the second area 420 to form a second array antenna 423, it is possible to perform various array antenna modes by diversifying coupling feeding methods by first conductive lines and second conductive lines'.

According to an embodiment, it is possible to perform an antenna radiation mode (first array mode) through the first array antenna 413 by feeding the first feeding unit 360. According to another embodiment, it is possible to perform an antenna radiation mode (second array mode) through the second array antenna 423 by feeding the second feeding unit 360'. According to another embodiment, it is possible to perform an antenna radiation mode (third array mode) through the first array antenna 413 and the second array antenna 423 by simultaneously feeding the first feeding unit 360 and the second feeding unit 360'. According to various embodiments of the disclosure, the antenna structure 400 may further include an array mode (3-1th array mode) forming single polarization and/or an array mode (3-2th array mode) forming dual polarization, as the third array mode.

Figure 14:
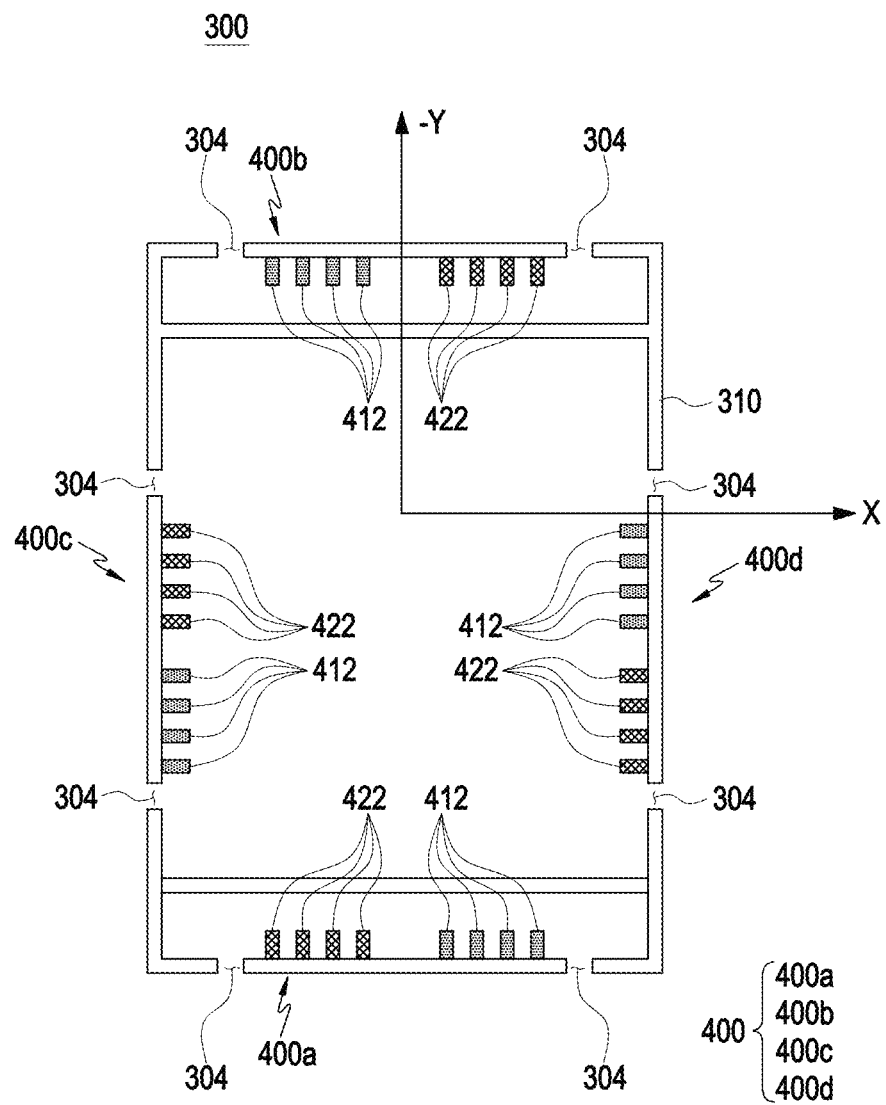
FIG. 14 illustrates an electronic device including a plurality of antenna structures according to an embodiment.

FIG. 14 illustrates an electronic device 300 including a plurality of antenna structures 400 according to an embodiment.

According to various embodiments, the electronic device 300 may be provided with a plurality of the antenna structures 400. Rather than a single antenna structure 400 formed in a limited portion of the electronic device 300, a plurality of antenna structures 400 may be formed in several portions of the electronic device 300. For example, an antenna structure 400 is formed in a lower portion of the electronic device 300 as in the embodiment shown in FIG. 14, and an antenna structure 400 may also be formed in the upper portion of the electronic device 300. Additionally or alternatively, an antenna structure 400 may also be formed on a left side and/or right side of the electronic device. For example, the antenna structures 400 may include a first antenna structure 400a including first antenna elements 412 and second antenna elements 422 positioned in at least a portion of the electronic device and a second antenna structure 400b positioned on an opposite side of the first antenna structure 400a with respect to the center of the electronic device. The antenna structures 400 may include a third antenna structure 400c positioned in at least a portion of the electronic device and a fourth antenna structure 400d positioned on an opposite side of the third antenna structure 400c with respect to the center of the electronic device. Other embodiments are possible as well.

Figure 15:
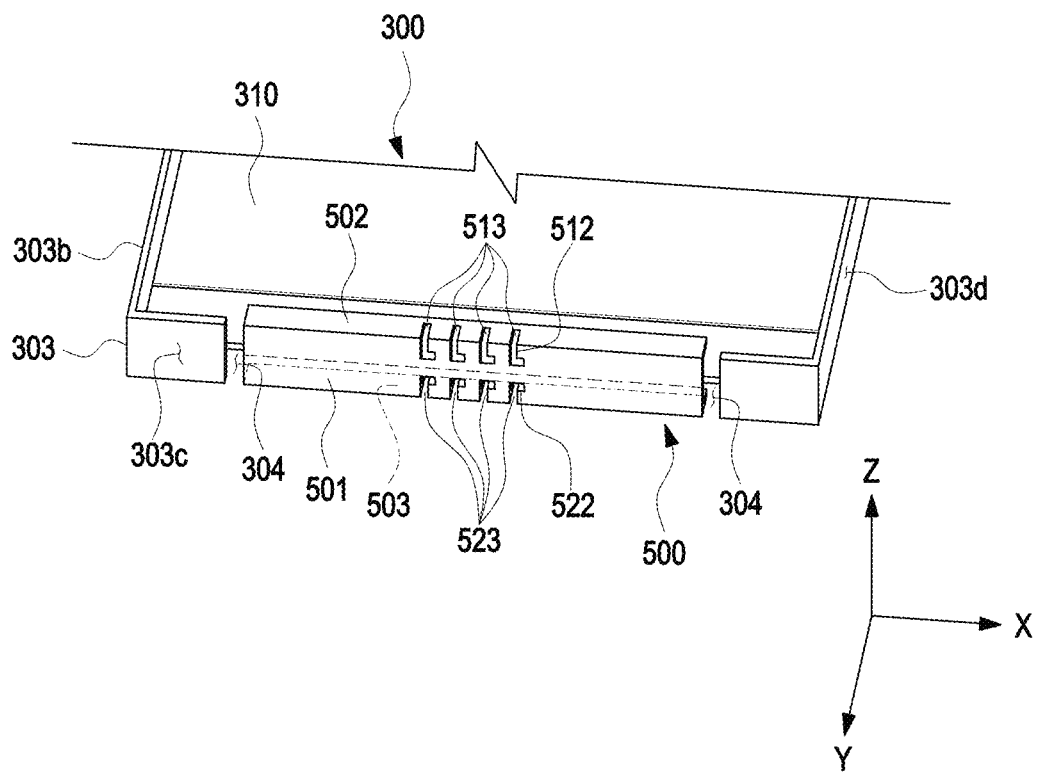
FIG. 15 illustrates a housing and an antenna structure of an electronic device according to an embodiment.
Figure 16:
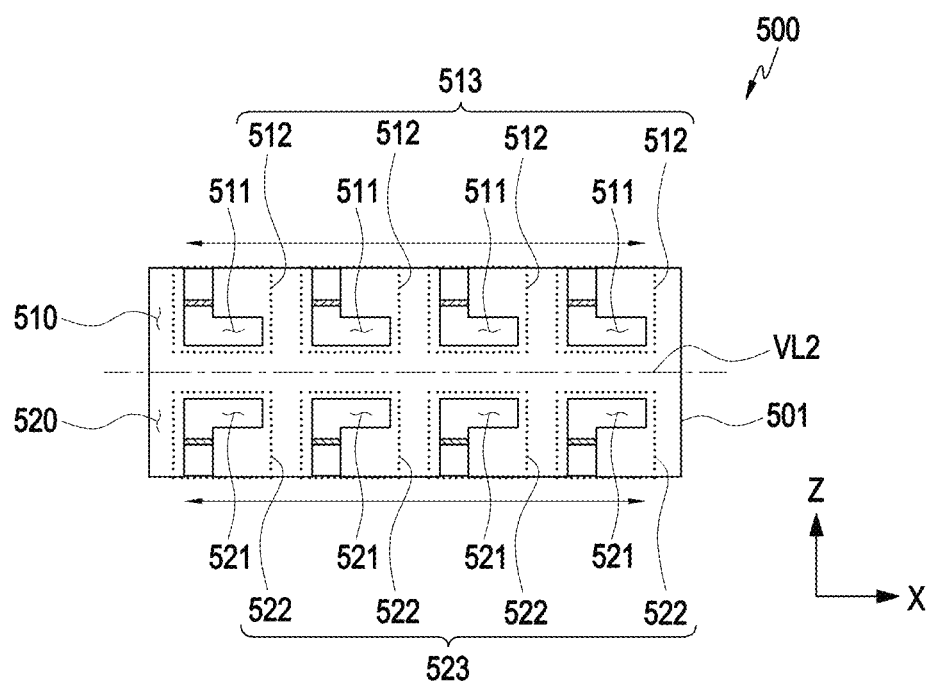
FIG. 16 illustrates an antenna structure according to an embodiment.

FIG. 15 illustrates a housing 310 and an antenna structure 500 of the electronic device 300, according to an embodiment. FIG. 16 illustrates an antenna structure 500 according to an embodiment.

In contrast to the antenna structure 400 illustrated in FIG. 4 (or FIG. 8), the antenna structure 500 shown in FIG. 15 may have the slot formed in a different position. Hereinafter, portions overlapping those of FIG. 4 are omitted from the description.

Referring to FIG. 15, in addition to at least one slot, antenna elements 512 and 522 may be formed in the side surface member 303. Further, according to an embodiment, a plurality of antenna elements 512 and 522 may be provided to form array antennas 513 and 523. According to an embodiment, the antenna module 500 may include at least one antenna element 512 and 522. According to another embodiment, the antenna structure 400 may include array antennas 513 and 523. For example, at least the first antenna element 512 may include at least one first slot (e.g., the first slot 511 of FIG. 16), and the second antenna element 422 may include a second slot (e.g., the second slot 521 of FIG. 16) having a different shape from the first slot 511. According to various embodiments, as there may be provided a plurality of first slots 511 and a plurality of second slots 521, a first array antenna 513 including the plurality of first antenna elements 512 and a second array antenna 523 including the plurality of second antenna elements 522 may be formed.

The first array antenna 513 and the second array antenna 523 according to the embodiment shown in FIGS. 15 and 16 may be separately disposed in a first area 510 and a second area 520 divided with respect to a line VL2 parallel to the X-axis direction (or second direction) of the side surface member 303. For example, the first array antenna 513 and the second array antenna 523 may be separately disposed in an upper area and a lower area when the conductive portion 501 of the side surface member 303 is viewed from the front.

According to an embodiment, the designated interval (e.g., the first interval) between the plurality of first antenna elements 512 included in the first array antenna 513 may be substantially identical to the designated interval (e.g., the second interval) between the plurality of second antenna elements included in the second array antenna 523. For example, each of the second antenna elements 522 included in the second array antenna 523 may be disposed corresponding to the position where each of the first antenna elements 512 included in the first array antenna 513 is formed.

According to various embodiments, there may further be included an extension portion that extends from the conductive portion 501 and has at least one surface at least partially facing in a direction different from the direction in which the first surface (e.g., the first surface 401a of FIG. 5) of the conductive portion 501 faces. For example, as the extension portion, a first extension portion 502, which has a second surface at least partially facing in a direction from the direction in which the first surface of the conductive portion 501 faces, and a second extension portion 503, which extends from the conductive portion 501 and has a third surface facing in a direction opposite to the direction in which the second surface faces, may be included. In an embodiment, the slot formed in the conductive portion 501 may extend in the extension portions 502 and 503. It is possible to form an antenna structure 500 that supports additional frequency bands through the extending slot.

Figure 17:
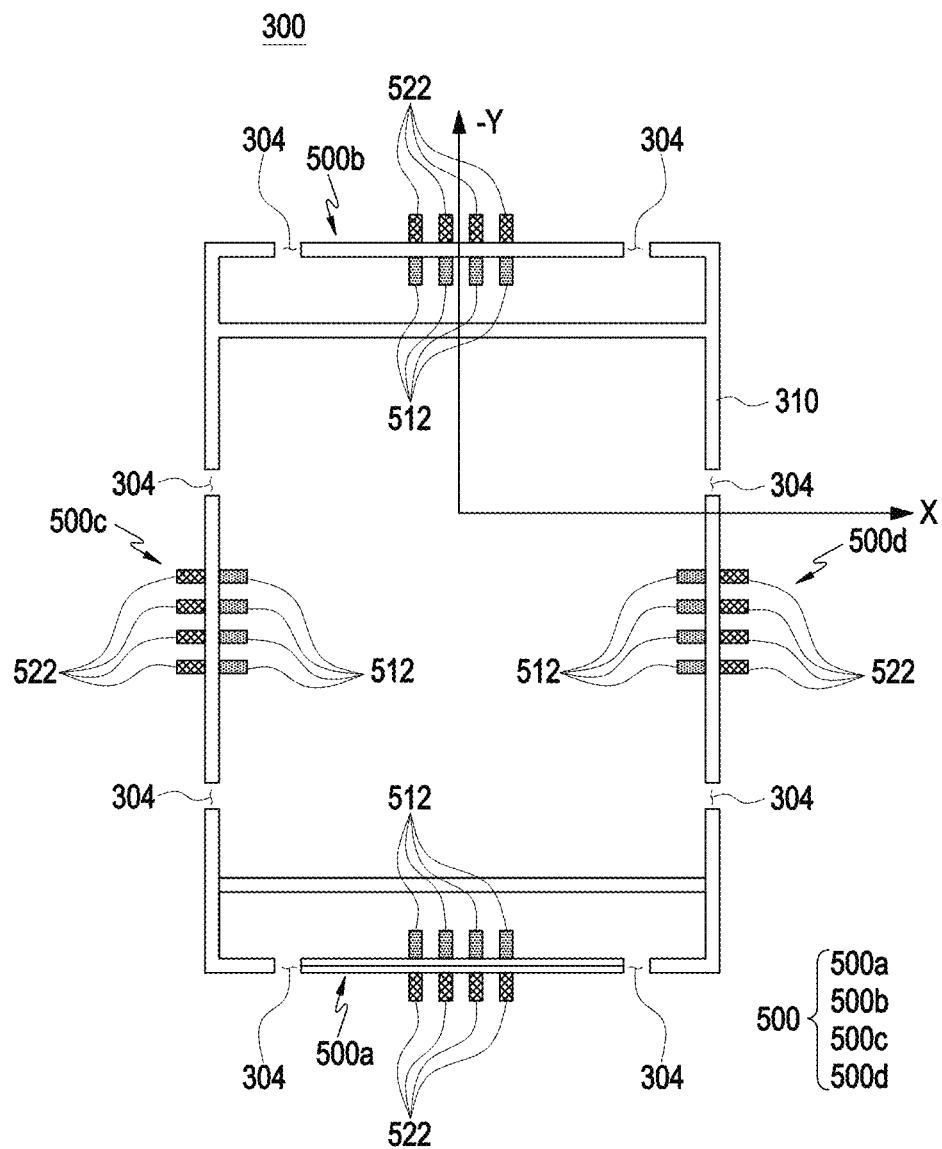
FIG. 17 illustrates an electronic device including a plurality of antenna structures according to an embodiment.

FIG. 17 illustrates an electronic device 300 including a plurality of antenna structures 500 according to an embodiment.

According to various embodiments, the electronic device 300 may be provided with a plurality of the antenna structures 500. Rather than a single antenna structure 500 formed in a limited portion of the electronic device, a plurality of antenna structures 500 may be formed in several portions of the electronic device. The plurality of antenna structures 500 may form a plurality of antenna element groups. At least one of the plurality of antenna element groups may be selected based on the reception sensitivity of the radio signal and be used for radio signal transmission/reception. For example, a portable terminal may include a first antenna element to a fourth antenna element 500a, 500b, 500c, and 500d, as in the embodiment of FIG. 14.

A feeding unit 360 may be connected in the antenna structure 500 shown in FIGS. 15, 16 and 17, enabling the antenna structure 500 to perform operations similar to those of the antenna structure 400 described in connection with FIGS. 4 to 14. For example, single polarization or dual polarization may be generated through the antenna structure 500. As another example, it is possible to implement massive multi-input multi-output (massive MIMO) or full dimensional MIMO (FD-MIMO) communication or diversity (spatial diversity) according to the environment of the communication channel, through the antenna structure 500.

Figure 18A:
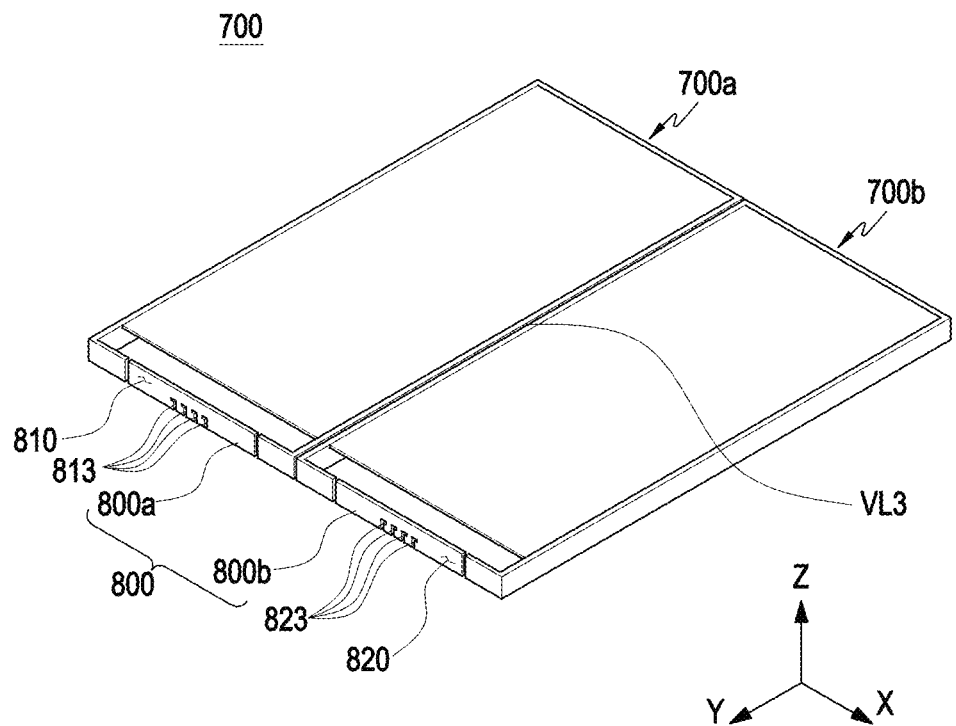
FIGS. 18A and 18B illustrate an unfolded state of an electronic device and an antenna structure, according to an embodiment.
Figure 18B:
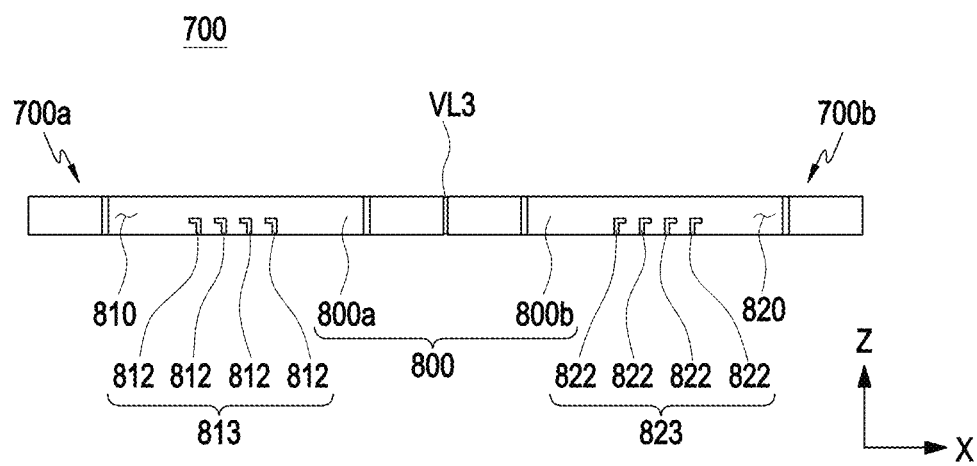
Figure 19A:
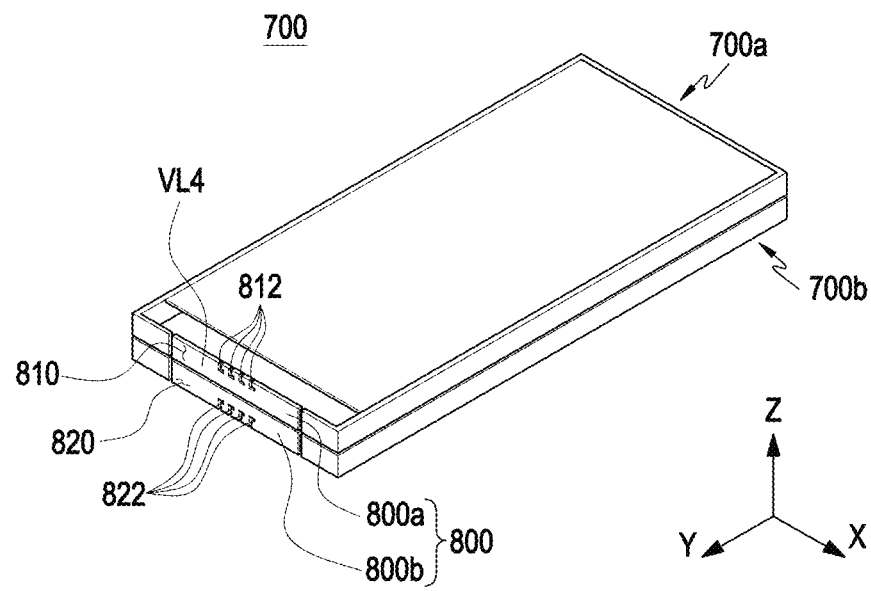
FIGS. 19A and 19B illustrate a folded state of an electronic device and an antenna structure, according to an embodiment.
Figure 19B:
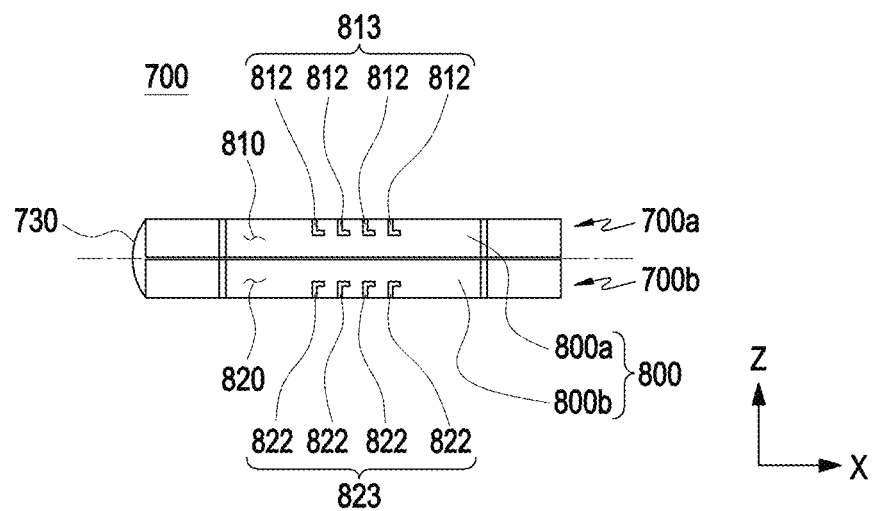

FIGS. 18A, 18B, 19A, and 19B illustrate a foldable electronic device 700 and an antenna structure 800 according to an embodiment. FIGS. 18A and 18B illustrate an unfolded state of an electronic device 700 and an antenna structure 800. FIGS. 19A and 19B illustrate a folded state of the electronic device 700 and the antenna structure 800.

According to various embodiments, the electronic device 700 (e.g., the electronic device 101 of FIG. 1) may correspond to a foldable electronic device in which a flexible display panel is disposed. The foldable electronic device may be configured such that a plurality of housings are rotatable with respect to each other. For example, the foldable electronic device may include a first housing 700a and a second housing 700b formed to be rotatable (or foldable) on the first housing 700b, as the foldable housings. According to an embodiment, the first housing structure 700a and the second housing structure 700b may be formed to be foldable through a hinge structure 730.

In the embodiment shown in FIGS. 18A, 18B, 19A, and 19B, an antenna structure 800 may be formed in a conductive portion (e.g., the conductive portion 401 of FIG. 4) of a side surface member (e.g., the side surface member 303 of FIG. 4). For example, the conductive portion may include a first conductive portion 800a having a first area 810, included in the first housing 700a, and a second conductive portion 800b having a second area 820, included in the second housing 700b.

According to various embodiments, when the foldable electronic device 700 is unfolded, for example, a virtual line (e.g., the virtual line VL3) passing through between the first area 810 and the second area 820 divide the conductive portion into a left and right portion (i.e., the first conductive portion 800a and the second conductive portion 800b) when the foldable electronic device 700 is unfolded, the first area 810 and the second area 820 may be configured to form a co-planar area parallel to the XY plane. According to various embodiments, when the foldable electronic device 700 is folded, for example, a virtual line (e.g., the virtual line VL4) passing through between the first area 810 and the second area 820 divide the conductive portion into a upper and lower portion (i.e., the first conductive portion 800a and the second conductive portion 800b) when the foldable electronic device 700 is folded, the first area 810 and the second area 820 may be stacked in a direction parallel to the Z axis. According to various embodiments, when the foldable electronic device 700 is folded, the first area 810 and the second area 820 may be disposed adjacent to each other. The first array antenna 813 formed on the first conductive portion 800a and the second array antenna 823 formed on the second conductive portion 800b may be disposed in positions corresponding to each other.

According to an embodiment, in a state in which the foldable electronic device 700 is unfolded, the antenna structure 800 may perform operations similar to those of the antenna structure 400 shown in FIG. 8 and therefore, have similar operational effects. As another example, in a state in which the foldable electronic device 700 is folded, the antenna structure 800 may perform operations similar to those of the antenna structure 500 shown in FIG. 16 and therefore, have similar operational effects.

Figure 20:
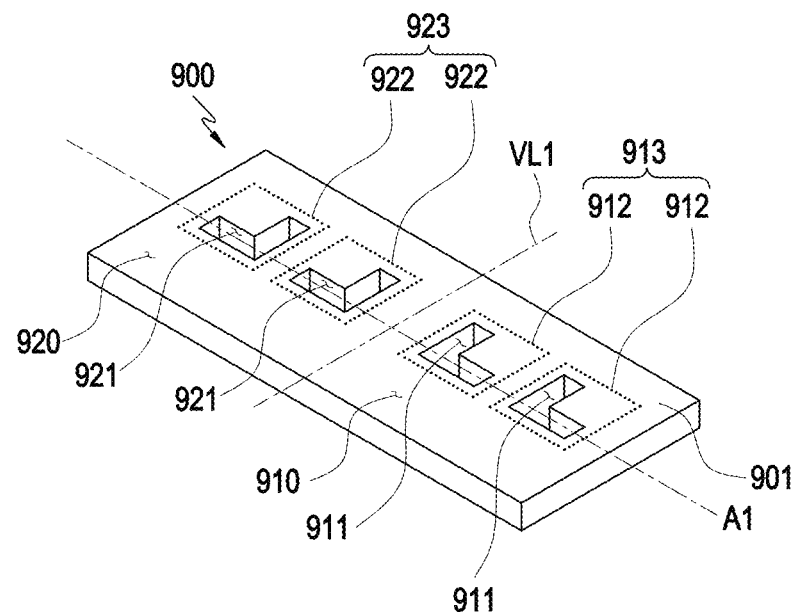
FIG. 20 illustrates an antenna module according to an embodiment.
Figure 21:
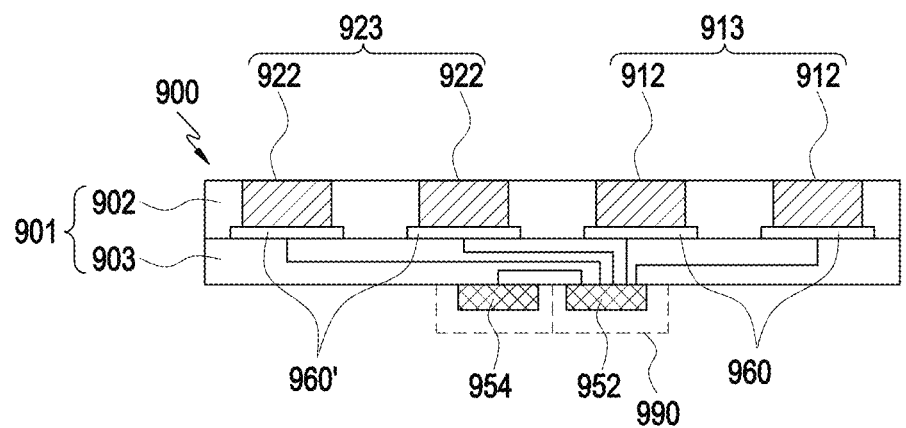
FIG. 21 is a cross-sectional view of the antenna module of FIG. 20, as viewed from one side, according to an embodiment.

FIG. 20 illustrates an antenna module 900 according to an embodiment. FIG. 21 is a cross-sectional view of the antenna module 900 of FIG. 20, as viewed from one side, according to an embodiment.

According to various embodiments of the disclosure, an antenna structure may be combined with a communication circuit, forming an antenna module. For example, the antenna module 900 may operate in substantially the same manner as the antenna structure 400 described above with reference to FIGS. 6 to 7D.

Referring to FIGS. 20 and 21, according to various embodiments, an antenna module 900 may include a PCB 901, a plurality of antenna elements 912 and 922 formed on the PCB 901, and/or a communication circuit 952. According to an embodiment, the first antenna element 912 and the second antenna element 922 may include at least one slot 911 and 921, respectively. There may be provided a plurality of first antenna elements 912 and a plurality of second antenna elements 922. The plurality of antenna elements 912 and 922 may form array antennas 913 and 923.

According to various embodiments, the antenna module 900 may include a communication circuit 952, a PMIC 954, or a module interface (not shown). Selectively, the antenna module 900 may further include a shielding member 990. According to other embodiments, at least one of the above-mentioned components may be omitted, or at least two of the components may be integrally formed with each other.

According to various embodiments, the PCB 901 may include an antenna layer 902 and a network layer 903. For example, the antenna elements 912 and 922 or feeding units 960 and 960' may be formed on the antenna layer 902. As another example, the communication circuit 952 may be electrically connected with the antenna elements 912 and 922 using wires or conductive vias in the network layer 903.

The array antennas 913 and 923 may include a plurality of antenna elements 912 and 922 disposed to form directional beams. The plurality of antenna elements 912 and 922 may be formed with slots 911 and 921 in the antenna layer 902 of the PCB 901.

According to various embodiments, the feeding units 960 and 960' may include a first feeding unit 960 disposed adjacent to the first slot 911 and a second feeding unit 960' disposed adjacent to the second slot 921. The antenna module 900 may independently feed the array antennas 913 and 923 through the first feeding unit 960 and the second feeding unit 960', respectively. For example, a first phase signal S1 may be applied to the first antenna element 912 through the first power feeding unit 960, and a second phase signal S2 may be applied to the second antenna element 922 through the second feeding unit 960'. Here, if the first phase signal S1 and the second phase signal S2 are shifted with a designated phase difference, either single polarization or dual polarization may be generated.

According to various embodiments, each antenna module 900 may include one communication circuit 952 and a PMIC 954 or may include a plurality of communication circuits and PMICs. For example, unlike FIG. 21, any one of the two communication circuits may be connected to the first feeding unit 960 to apply a phase signal, and the other communication circuit may be connected to the second feeding unit 960' to apply a phase signal.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration.

According to various embodiments, operations performed by the module, the program, or another component may be carried out sequentially, in parallel, repeatedly, or heuristically, or one or more of the operations may be executed in a different order or omitted, or one or more other operations may be added.

As described above, there may be provided an electronic device (e.g., the electronic device 300 of FIG. 3A) comprising a housing (e.g., the housing 310 of FIG. 3A) including a first plate, a second plate facing in a direction opposite to the first plate, and a side surface member (e.g., the side surface member 303 of FIG. 3A) surrounding a space between the first plate and the second plate and including a conductive portion (e.g., the conductive portion 401 of FIG. 4); a communication module (e.g., the communication module 190 of FIG. 1), and an antenna structure (e.g., the antenna structure 400 of FIG. 4) electrically connected with the communication module, wherein the antenna structure includes at least one first antenna element (e.g., the first antenna element 412 of FIG. 6) formed in the conductive portion and including a first slot (e.g., the first slot 411 of FIG. 6) having a first portion (e.g., the first portion 411a of FIG. 6) extending in a first length (e.g., the first length Ls1 of FIG. 6) in a first direction (e.g., a direction parallel to the Z axis of FIG. 6) and a second portion (e.g., the second portion 411b of FIG. 6) extending in a second length (e.g., the second length Ls2 of FIG. 6) in a second direction (e.g., a direction parallel to the −X axis of FIG. 6 or a direction parallel to the X axis of FIG. 7A) different from the first direction, and at least one second antenna element (e.g., the second antenna element 422 of FIG. 6) formed in a position spaced apart by a predetermined distance from the first antenna element in the conductive portion and including at least one second slot (e.g., the second slot 421 of FIG. 6) having a fourth portion (e.g., the fourth portion 421a of FIG. 6) extending in the first length in the first direction and a fifth portion (e.g., the fifth portion 411b of FIG. 6) extending in the second length in a third direction (e.g., a direction parallel to the X axis of FIG. 6 or a direction parallel to the −X axis of FIG. 7A) different from the second direction.

According to various embodiments, the second direction may be opposite to the third direction.

According to various embodiments, a plurality of the first antenna elements may be provided. The first antenna elements are spaced apart by a first designated interval and are included in a first array antenna. A plurality of the second antenna elements may be provided. The second antenna elements are spaced apart by a second designated interval and are included in a second array antenna.

According to various embodiments, the second designated interval may be set to be identical to the first designated interval.

According to various embodiments, the conductive portion may include a first area (e.g., the first area 410 of FIG. 6) and a second area (e.g., the second area 420 of FIG. 6) disposed on a first side and second side of a virtual line (e.g., the virtual line VL1 of FIG. 6) parallel to the first direction and passing through the conductive portion, when viewed from above the conductive portion. The first antenna element may be disposed in the first area, and the second antenna element is disposed in the second area.

According to various embodiments, the conductive portion may include a first area and a second area disposed on a first side and second side of a virtual line (e.g., the virtual line VL2 of FIG. 16) parallel to the second direction and passing through the conductive portion, when viewed from above the conductive portion. The first antenna element may be disposed in the first area, and the second antenna element is disposed in the second area.

According to various embodiments, the electronic device may be a foldable electronic device (e.g., the foldable electronic device 700 of FIG. 18A) including a first housing (e.g., the first housing 700a of FIG. 18A) and a second housing (e.g., the second housing 700b of FIG. 18A). The conductive portion (e.g., the conductive portion 800 of FIG. 18A) may include a first conductive portion (e.g., the first conductive portion 800a of FIG. 18A) included in the first housing and formed with the first antenna element, and a second conductive portion (e.g., the second conductive portion 800b of FIG. 18A) included in the second housing and formed with the second antenna element. When the foldable electronic device is folded, the first antenna element and the second antenna element may be formed to be disposed in positions corresponding to each other.

According to various embodiments, the conductive portion may include a first surface (e.g., the first surface 401a of FIG. 5A) surrounding an internal surface of the electronic device and facing an outside of the electronic device. The conductive portion may include an extension portion extending to the internal space and formed with at least one surface at least partially facing in a direction different from a direction in which the first surface faces.

According to various embodiments, the extension portion may include a first extension portion formed with a second surface (e.g., the second surface 402a of FIG. 5A) at least partially facing in a direction different from the direction in which the first surface faces. At least a portion of the first slot may be formed in the first extension portion (e.g., the first extension portion 402 of FIG. 4).

According to various embodiments, the extension portion may include a first extension portion formed with a second surface at least partially facing in a direction different from the direction in which the first surface faces and a second extension portion (e.g., the second extension portion 503 of FIG. 15) formed with a third surface facing in a direction opposite to a direction in which the second surface faces.

According to various embodiments, the electronic device may further comprise a cover member or a display member (e.g., the display member 311 of FIG. 3A) covering at least a portion of the extension portion.

According to various embodiments, the first antenna element may be connected to the communication module by a first feeding unit (e.g., the first feeding unit 360 of FIG. 11), and the second antenna element may be connected to the communication module by a second feeding unit (e.g., the second feeding unit 360' of FIG. 11).

A first conductive line for feeding the conductive portion formed with the first antenna element may be disposed in the space, and a second conductive line for feeding the conductive portion formed with the second antenna element may be disposed in the space.

According to various embodiments, the first conductive line and the second conductive line may be capable of independently feeding the conductive portion.

According to various embodiments, the first conductive line may be configured to apply a first phase signal (e.g., the first phase signal S1 of FIGS. 7A to 7D) to the first antenna element, and the second conductive line may be configured to apply a second phase signal (e.g., the second phase signal S2 of FIGS. 7A to 7D) to the second antenna element. Based on the first phase signal and the second phase signal are shifted with a designated phase difference, either single polarization or dual polarization may be generated.

According to various embodiments, the electronic device may further comprise at least one processor (e.g., the processor 120 of FIG. 1). The processor may be configured to control beamforming in a horizontal direction using the antenna structure or to control beamforming in a vertical direction using the antenna structure.

According to various embodiments of the disclosure, there may be provided an antenna module (e.g., the antenna module 900 of FIG. 20) comprising a printed circuit board (e.g., the printed circuit board 901 of FIG. 20), a communication circuit, and a plurality of antenna elements (e.g., the plurality of antenna elements 912 and 922 of FIG. 20) formed on the printed circuit board and electrically connected with the communication circuit, wherein the plurality of antenna elements include at least one first antenna element (e.g., the first antenna element 912 of FIG. 20) formed in a first area (e.g., the first area 910 of FIG. 20) of the printed circuit board and including at least one first slot (e.g., the first slot 911 of FIG. 20) including a first portion (e.g., the first portion 411a of FIG. 6) extending in a first length (e.g., the first length Ls1 of FIG. 6) in a first direction (e.g., a direction parallel to the Z axis of FIG. 6) and a second portion (e.g., the second portion 411b of FIG. 6) extending in a second length (e.g., the second length Ls2 of FIG. 6) in a second direction (e.g., a direction parallel to the −X axis of FIG. 6 or a direction parallel to the X axis of FIG. 7A) different from the first direction, and at least one second antenna element (e.g., the second antenna element 922 of FIG. 20) formed in a second area (e.g., the second area 920 of FIG. 20) of the printed circuit board and including at least one second slot (e.g., the second slot 921 of FIG. 20) including a fourth portion (e.g., the fourth portion 411a of FIG. 6) extending in the first length in the first direction and a fifth portion (e.g., the fifth portion 421b of FIG. 6) extending in the second length (e.g., the second length Ls2 of FIG. 6) in a third direction (e.g., a direction parallel to the X axis of FIG. 6 or a direction parallel to the −X axis of FIG. 7A) different from the second direction.

According to various embodiments, the printed circuit board may include an antenna layer (e.g., the antenna layer 902 of FIG. 21) and a network layer (e.g., the antenna layer 903 of FIG. 21). The plurality of antenna elements may be formed on the conductive layer, and the plurality of antenna elements may be connected with the communication circuit using feeding units (e.g., the feeding units 960 and 960' of FIG. 21) electrically connected.

According to various embodiments, the feeding units may include a first feeding unit (e.g., the feeding unit 960 of FIG. 21) disposed adjacent to the conductive layer formed with the first slot and a second feeding unit (e.g., the feeding unit 960 of FIG. 21) disposed adjacent to the conductive layer formed with the second slot.

According to various embodiments, the first feeding unit and the second feeding unit may be capable of independently feeding. The first feeding unit may apply a first phase signal to the first slot, and the second feeding unit may apply a second phase signal to the second slot. If the first phase signal and the second phase signal are shifted with a designated phase difference, either single polarization or dual polarization may be generated.

As described above, there may be provided an electronic device (e.g., the electronic device 300 of FIG. 3A) comprising an antenna module (e.g., the antenna module 900 of FIG. 20), comprising a housing (e.g., the housing 301 of FIG. 3A) including a first plate; a second plate facing in a direction opposite to the first plate; and a side surface member (e.g., the side surface member 303 of FIG. 3A) surrounding a space between the first plate and the second plate; and at least one antenna module disposed in an internal space of the housing, the antenna module comprising a printed circuit board (e.g., the printed circuit board 901 of FIG. 20); a communication circuit; and a plurality of antenna elements (e.g., the plurality of antenna elements 912 and 922 of FIG. 20) formed on the printed circuit board and electrically connected with the communication circuit, wherein the plurality of antenna elements include at least one first antenna element (e.g., the first antenna element 912 of FIG. 20) formed in a first area (e.g., the first area 910 of FIG. 20) of the printed circuit board and including at least one first slot (e.g., the first slot 911 of FIG. 20) including a first portion (e.g., the first portion 411a of FIG. 6) extending in a first length (e.g., the first length Ls1 of FIG. 6) in a first direction (e.g., a direction parallel to the Z axis of FIG. 6) and a second portion (e.g., the second portion 411b of FIG. 6) extending in a second length (e.g., the second length Ls2 of FIG. 6) in a second direction (e.g., a direction parallel to the −X axis of FIG. 6 or a direction parallel to the X axis of FIG. 7A) different from the first direction, and at least one second antenna element (e.g., the second antenna element 922 of FIG. 20) formed in a second area (e.g., the second area 920 of FIG. 20) of the printed circuit board and including at least one second slot (e.g., the second slot 921 of FIG. 20) including a fourth portion (e.g., the fourth portion 411a of FIG. 6) extending in the first length in the first direction and a fifth portion (e.g., the fifth portion 421b of FIG. 6) extending in the second length (e.g., the second length Ls2 of FIG. 6) in a third direction (e.g., a direction parallel to the X axis of FIG. 6 or a direction parallel to the −X axis of FIG. 7A) different from the second direction.

The present disclosure teaches resonant frequencies or frequency bands forming a resonant frequency depending on the arrangement structure and operations of a plurality of first slot sets or a plurality of second slot sets or first slots and second slots included therein. However, the same may be set as appropriate depending on, e.g., the antenna element to be actually manufactured or the structure, requirements, and actual use environment of the electronic device equipped with the antenna element.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device, comprising:
   a housing including a first plate, a second plate facing in a direction opposite to the first plate, and a side surface member surrounding a space between the first plate and the second plate and including a conductive portion;
   a communication module; and
   an antenna structure electrically connected with the communication module,
   wherein the antenna structure includes:
      at least one first antenna element formed in the conductive portion and including a first slot having a first portion extending in a first length in a first direction and a second portion extending in a second length in a second direction different from the first direction, and
      at least one second antenna element formed in a position spaced apart by a predetermined distance from the first antenna element in the conductive portion and including at least one second slot having a fourth portion extending in the first length in the first direction and a fifth portion extending in the second length in a third direction different from the second direction.

2. The electronic device of claim 1,
   wherein the second direction is opposite to the third direction.

3. The electronic device of claim 1,
   wherein a plurality of the first antenna elements is provided,
   wherein the first antenna elements are spaced apart by a first designated interval and are included in a first array antenna,
   wherein a plurality of the second antenna elements is provided, and
   wherein the second antenna elements are spaced apart by a second designated interval and are included in a second array antenna.

4. The electronic device of claim 3,
   wherein the second designated interval is set to be identical to the first designated interval.

5. The electronic device of claim 1,
   wherein the conductive portion includes a first area and a second area disposed on a first side and second side of a virtual line parallel to the first direction and passing through the conductive portion, when viewed from above the conductive portion, wherein the first antenna element is disposed in the first area, and wherein the second antenna element is disposed in the second area.

6. The electronic device of claim 1, wherein the conductive portion includes a first area and a second area disposed on a first side and second side of a virtual line parallel to the second direction and passing through the conductive portion, when viewed from above the conductive portion, wherein the first antenna element is disposed in the first area, and wherein the second antenna element is disposed in the second area.

7. The electronic device of claim 1, wherein the electronic device is a foldable electronic device including a first housing and a second housing, wherein the conductive portion includes:

a first conductive portion included in the first housing and formed with the first antenna element, and a second conductive portion included in the second housing and formed with the second antenna element, and wherein, when the foldable electronic device is folded, the first antenna element and the second antenna element are formed to be disposed in positions corresponding to each other.

8. The electronic device of claim 1, wherein the conductive portion includes a first surface surrounding an internal surface of the electronic device and facing an outside of the electronic device, and wherein the conductive portion includes an extension portion extending to the internal space and formed with at least one surface at least partially facing in a direction different from a direction in which the first surface faces.

9. The electronic device of claim 8, wherein the extension portion includes a first extension portion formed with a second surface at least partially facing in a direction different from the direction in which the first surface faces, and wherein a third portion of the first slot is formed in the first extension portion.

10. The electronic device of claim 8, further comprising a display member or a cover member covering at least a portion of the extension portion.

11. The electronic device of claim 1, wherein the first antenna element is connected to the communication module by a first feeding unit, and wherein the second antenna element is connected to the communication module by a second feeding unit.

12. The electronic device of claim 1, wherein a first conductive line configured to feed the conductive portion formed with the first antenna element is disposed in the space, and wherein a second conductive line configured to feed the conductive portion formed with the second antenna element is disposed in the space.

13. The electronic device of claim 12, wherein the first conductive line and the second conductive line are capable of independently feeding the conductive portion.

14. The electronic device of claim 12, wherein the first conductive line is configured to apply a first phase signal to the first antenna element, wherein the second conductive line is configured to apply a second phase signal to the second antenna element, and wherein, based on the first phase signal and the second phase signal being shifted with a designated phase difference, either single polarization or dual polarization is generated.

15. The electronic device of claim 1, further comprising at least one processor, wherein the processor is configured to control beamforming in a horizontal direction using the antenna structure or to control beamforming in a vertical direction using the antenna structure.

16. An antenna module, including:

a printed circuit board;

a communication circuit; and a plurality of antenna elements formed on the printed circuit board and electrically connected with the communication circuit, wherein the plurality of antenna elements include at least one first antenna element formed in a first area of the printed circuit board and including at least one first slot including a first portion extending in a first length in a first direction and a second portion extending in a second length in a second direction different from the first direction, and at least one second antenna element formed in a second area of the printed circuit board and including at least one second slot including a fourth portion extending in the first length in the first direction and a fifth portion extending in the second length in a third direction different from the second direction.

17. The electronic device of claim 16, wherein the printed circuit board includes an antenna layer and a network layer, and wherein the plurality of antenna elements are formed on the antenna layer, and the plurality of antenna elements are connected with the communication circuit using feeding units electrically connected.

18. The electronic device of claim 17, wherein the feeding units include a first feeding unit and a second feeding unit, wherein the first feeding unit applies a first phase signal to the first slot, and the second feeding unit applies a second phase signal to the second slot, and wherein based on the first phase signal and the second phase signal are shifted with a designated phase difference, either single polarization or dual polarization is generated.

19. An electronic device, including:

an antenna module having a housing including a first plate, a second plate facing in a direction opposite to the first plate, and a side surface member surrounding a space between the first plate and the second plate, and at least one antenna module disposed in an internal space of the housing, the antenna module comprising a printed circuit board, a communication circuit, and a plurality of antenna elements formed on the printed circuit board and electrically connected with the communication circuit, wherein the plurality of antenna elements include at least one first antenna element formed in a first area of the printed circuit board and including at least one first slot including a first portion extending in a first length in a first direction and a second portion extending in a second length in a second direction different from the first direction, and at least one second antenna element formed in a second area of the printed circuit board and including at least one second slot including a fourth portion extending in the first length in the first direction and a fifth portion extending in the second length in a third direction different from the second direction.

* * * * *